US012619364B2

(12) United States Patent (10) Patent No.: US 12,619,364 B2

Choi et al. (45) Date of Patent: May 5, 2026

(54) STORAGE DEVICE AND STORAGE SYSTEM INCLUDING THE SAME

(71) Applicant: Samsung Electronics Co., Ltd., Suwon-si (KR)

(72) Inventors: Wansoo Choi, Suwon-si (KR); Jeonguk Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/779,137

(22) Filed: Jul. 22, 2024

(65) Prior Publication Data

US 2025/0238151 A1 Jul. 24, 2025

(30) Foreign Application Priority Data

Jan. 23, 2024 (KR) ......................... 10-2024-0009893

(51) Int. Cl.
G06F 3/06 (2006.01)

(52) U.S. Cl.
CPC .......... G06F 3/0625 (2013.01); G06F 3/0634 (2013.01); G06F 3/068 (2013.01)

(58) Field of Classification Search
CPC ......... G06F 3/0634; G06F 3/0625; G06F 3/06
See application file for complete search history.

(56) References Cited

U.S. PATENT DOCUMENTS 5,805,910 A 9/1998 Lee et al.
8,578,144 B2 11/2013 Bower, III et al.

8,984,242 B2 3/2015 Kim et al.
9,477,294 B2 10/2016 Nishijima et al.
9,996,291 B1 * 6/2018 Izhar ................... G06F 11/1441
10,296,461 B2 5/2019 Takano
10,901,477 B2 1/2021 Seto (Continued)

FOREIGN PATENT DOCUMENTS

JP 5388836 B2 1/2014

OTHER PUBLICATIONS

S. Liu, W. Zhang, M. Lv, Q. Chen and N. Guan, "Surviving Transient Power Failures with SRAM Data Retention," 2021 Design, Automation & Test in Europe Conference & Exhibition (DATE), Grenoble, France, 2021, pp. 868-873.*

(Continued)

*Primary Examiner* — Pierre Michel Bataille
(74) *Attorney, Agent, or Firm* — Muir Patent Law, PLLC

(57) ABSTRACT

The storage device includes a plurality of non-volatile memories, at least one volatile memory, and a storage controller. The storage controller controls operations of the non-volatile memories and the volatile memory, and outputs leakage current information on data retention. When the storage device enters a hibernation mode to reduce power consumption, the storage device operates in a selected operation mode from among a plurality of operation modes based on the leakage current information. In the hibernation mode, the storage device stores first backup data and second backup data in the volatile memory, stores the first backup data and the second backup data in the non-volatile memories, or outputs the second backup data, depending on the selected operation mode. The first backup data is received from an external device, and the second backup data is internally stored in the storage device.

20 Claims, 29 Drawing Sheets

(56) References Cited

U.S. PATENT DOCUMENTS

| | | | |
|---|---|---|---|
| 11,294,597 B2 | 4/2022 | Lee | |
| 11,748,005 B2 | 9/2023 | Grosz et al. | |
| 2012/0079291 A1* | 3/2012 | Yang | G11C 5/141 |
| | | | 713/300 |
| 2012/0117344 A1* | 5/2012 | Kim | G06F 1/3275 |
| | | | 711/E12.008 |
| 2013/0097458 A1* | 4/2013 | Sekino | G06F 11/1441 |
| | | | 714/E11.138 |
| 2013/0166866 A1* | 6/2013 | Yerushalmi | G06F 1/3275 |
| | | | 711/E12.001 |
| 2013/0179715 A1* | 7/2013 | Sun | G06F 1/3234 |
| | | | 713/323 |
| 2014/0140135 A1* | 5/2014 | Okano | G06F 11/1441 |
| | | | 365/185.08 |
| 2014/0331071 A1* | 11/2014 | Miller | G06F 1/263 |
| | | | 713/340 |
| 2016/0283149 A1* | 9/2016 | Chiou | G11C 14/009 |
| 2019/0279704 A1* | 9/2019 | Derner | G06F 3/0679 |
| 2022/0197368 A1 | 6/2022 | Liang et al. | |
| 2023/0138586 A1* | 5/2023 | Hong | G06F 3/0673 |
| | | | 711/162 |

OTHER PUBLICATIONS

Y. Son, M. Kim, S. Kim, H. Y. Yeom, N. S. Kim and H. Han, "Design and Implementation of SSD-Assisted Backup and Recovery for Database Systems," in IEEE Transactions on Knowledge and Data Engineering, vol. 32, No. 2, pp. 260-274, Feb. 1, 2020.*

* cited by examiner

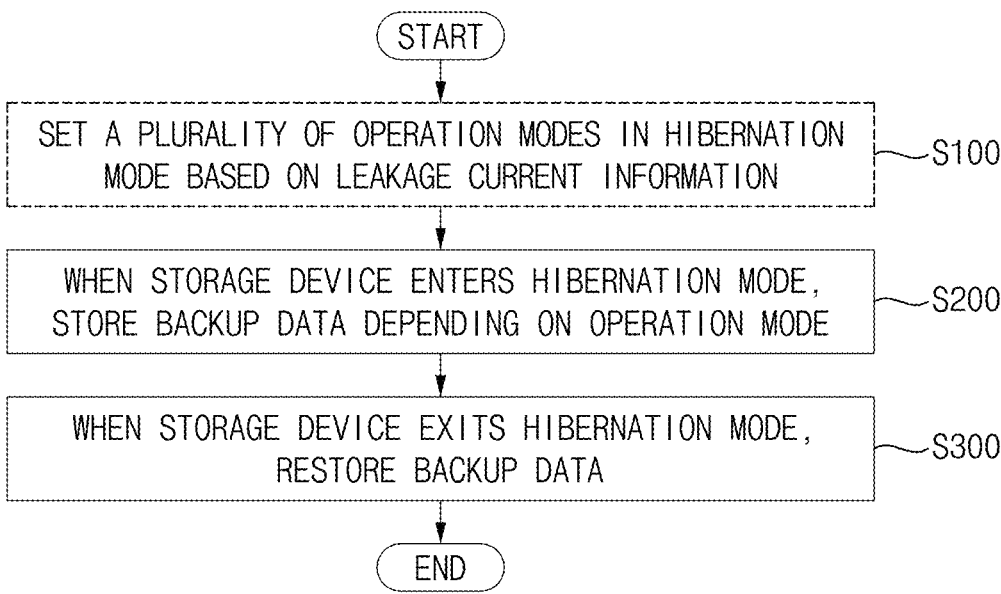

```
                        START
                          │
                          ▼
┌─────────────────────────────────────────────────┐
│ SET A PLURALITY OF OPERATION MODES IN HIBERNATION│──S100
│   MODE BASED ON LEAKAGE CURRENT INFORMATION      │
└─────────────────────────────────────────────────┘
                          │
                          ▼
┌─────────────────────────────────────────────────┐
│   WHEN STORAGE DEVICE ENTERS HIBERNATION MODE,   │──S200
│  STORE BACKUP DATA DEPENDING ON OPERATION MODE   │
└─────────────────────────────────────────────────┘
                          │
                          ▼
┌─────────────────────────────────────────────────┐
│   WHEN STORAGE DEVICE EXITS HIBERNATION MODE,    │──S300
│            RESTORE BACKUP DATA                   │
└─────────────────────────────────────────────────┘
                          │
                          ▼
                        END
```

FIG. 3

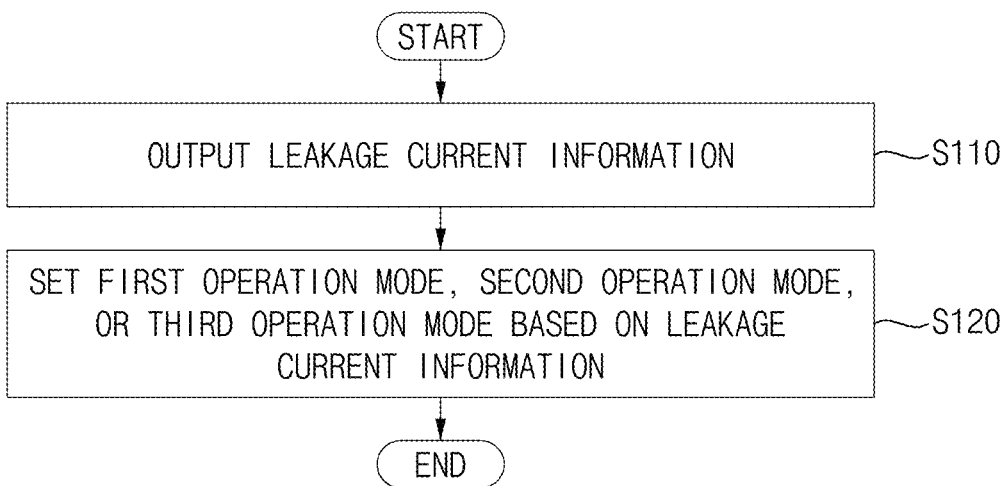

```
                        START
                          │
                          ▼
┌─────────────────────────────────────────────────┐
│      OUTPUT LEAKAGE CURRENT INFORMATION          │──S110
└─────────────────────────────────────────────────┘
                          │
                          ▼
┌─────────────────────────────────────────────────┐
│ SET FIRST OPERATION MODE, SECOND OPERATION MODE, │──S120
│   OR THIRD OPERATION MODE BASED ON LEAKAGE       │
│              CURRENT INFORMATION                 │
└─────────────────────────────────────────────────┘
                          │
                          ▼
                        END
```

| OPERATION MODE | HOST DEVICE | STORAGE DEVICE |
|---|---|---|
| OP1 | DATA RETENTION POWER | POWER OFF |
| OP2 | POWER OFF | DATA RETENTION POWER |
| OP3 | POWER OFF | POWER OFF |

FIG. 6B

200 — HOST DEVICE

210 — HOST PROCESSOR

220 — HOST MEMORY

BDAT1

BDAT2

300 — STORAGE DEVICE

310 — STORAGE CONTROLLER

320 — NVM

330 — VM

FIG. 10B
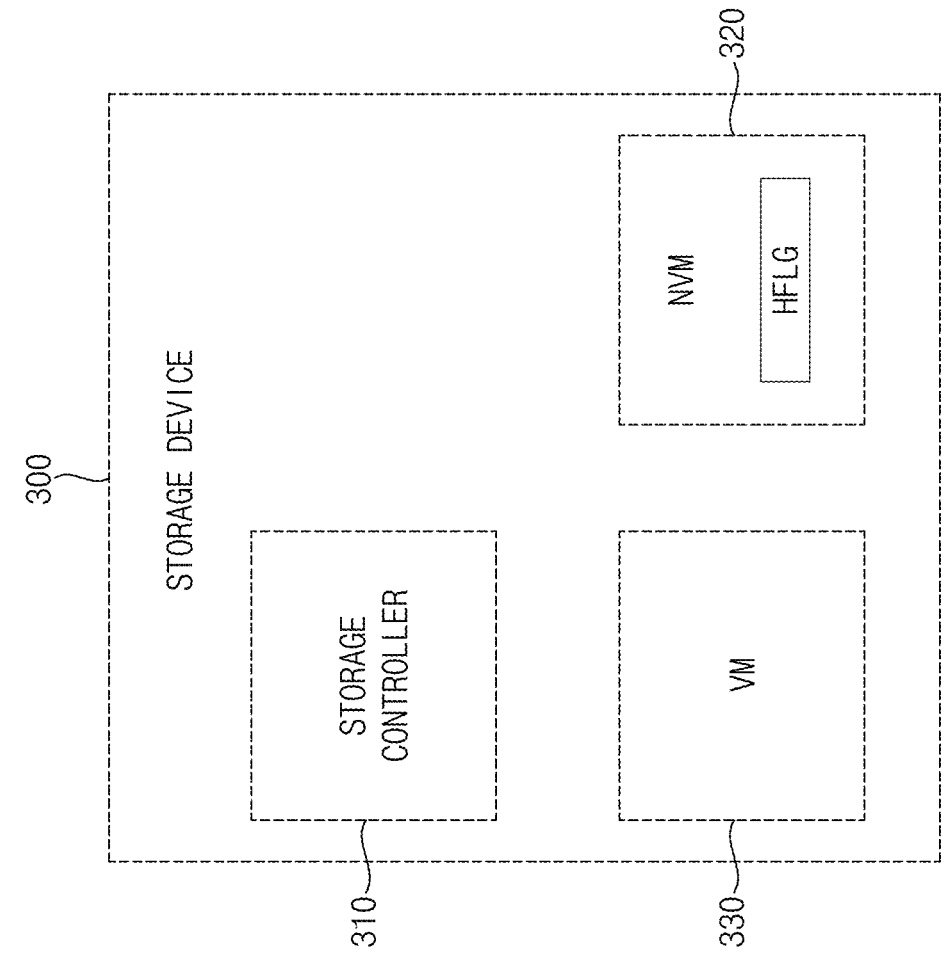
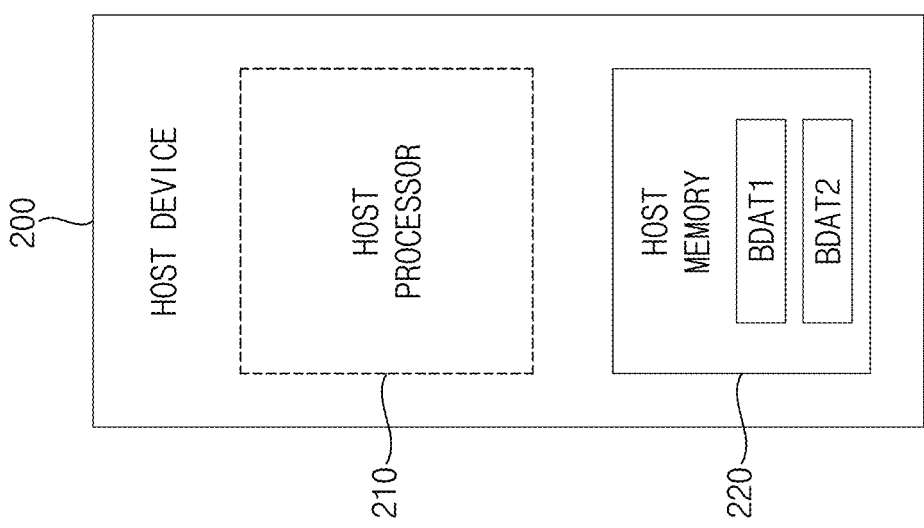

START

RECEIVE FIRST BACKUP DATA — S221

STORE FIRST AND SECOND BACKUP DATA IN VOLATILE MEMORY — S223

PERFORM DATA RETENTION OPERATION — S225

END

200

300

HOST DEVICE

STORAGE DEVICE

EN_OP2

BDAT1

RDY

GO_OP2

P_OFF

VMa

BDAT1

BDAT2

VMb

VMc

VM

REGa

BDAT1

BDAT2

REGb

REGc

FIG. 19B

```
              ( START )
                  │
                  ▼
┌─────────────────────────────────┐
│           POWER ON              │──S331
└─────────────────────────────────┘
                  │
                  ▼
┌─────────────────────────────────┐
│     OUTPUT FIRST BACKUP DATA    │──S333
└─────────────────────────────────┘
                  │
                  ▼
┌─────────────────────────────────┐
│   RESTORE SECOND BACKUP DATA    │──S335
└─────────────────────────────────┘
                  │
                  ▼
               ( END )
```

FIG. 23B
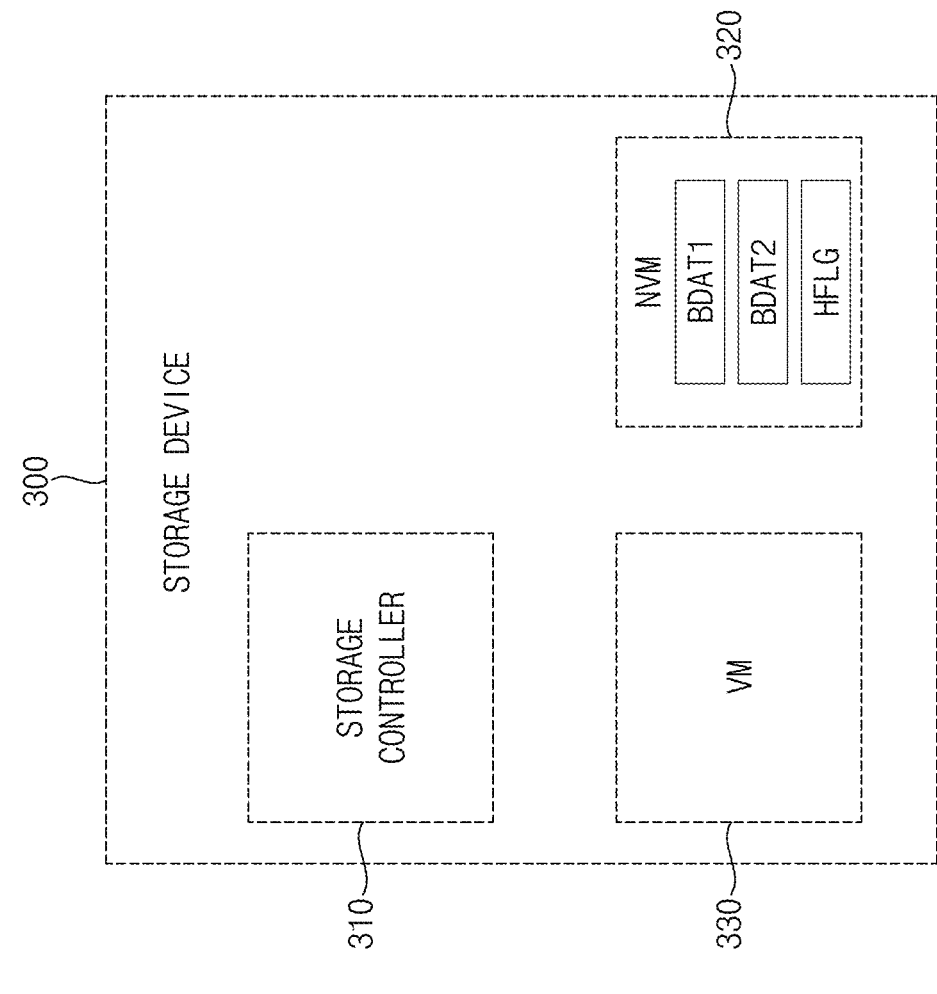
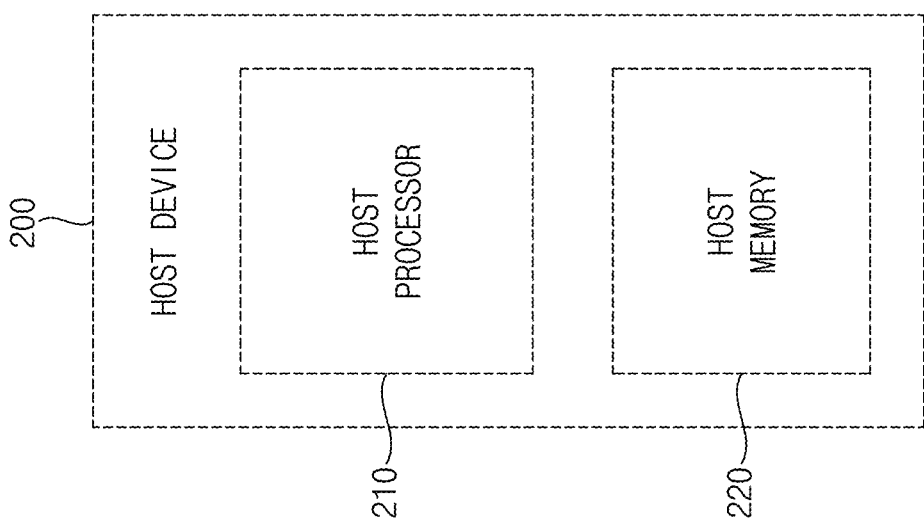

FIG. 28A
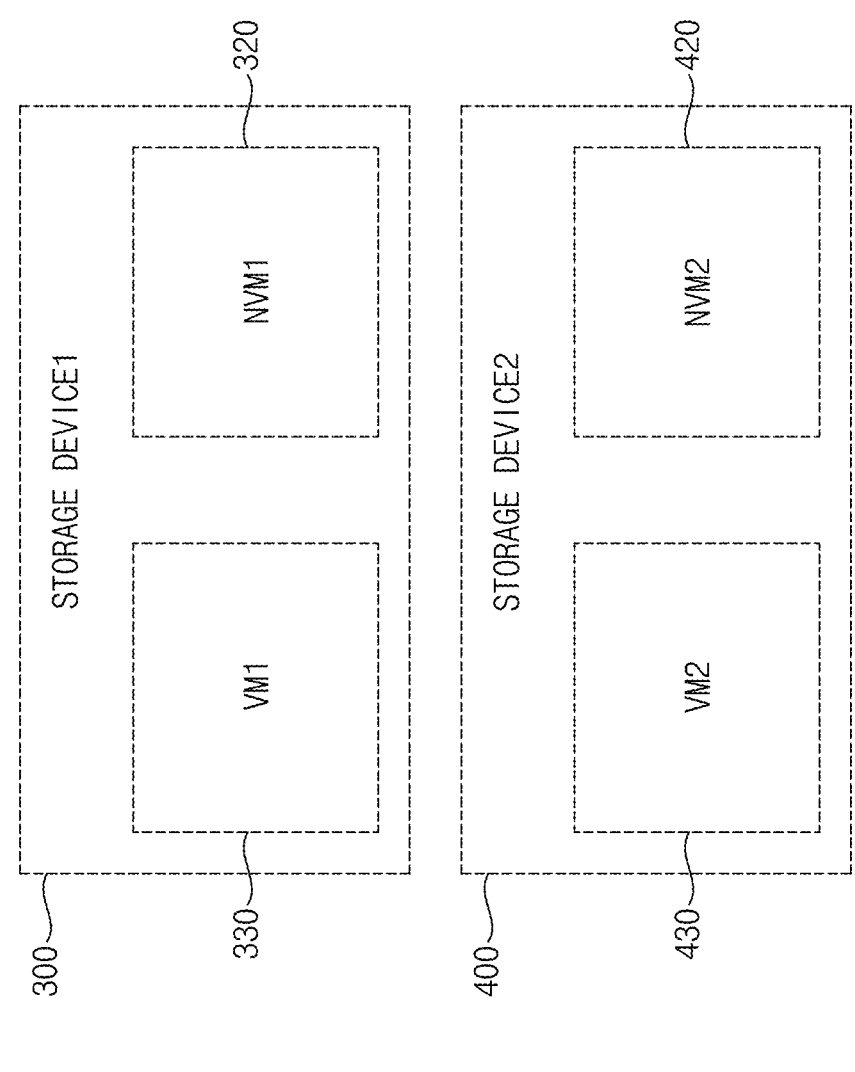
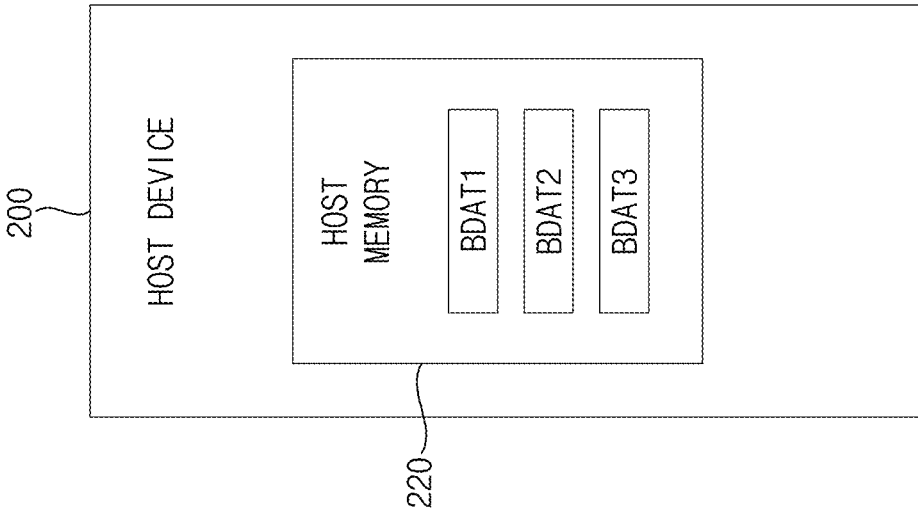

Figure 30:
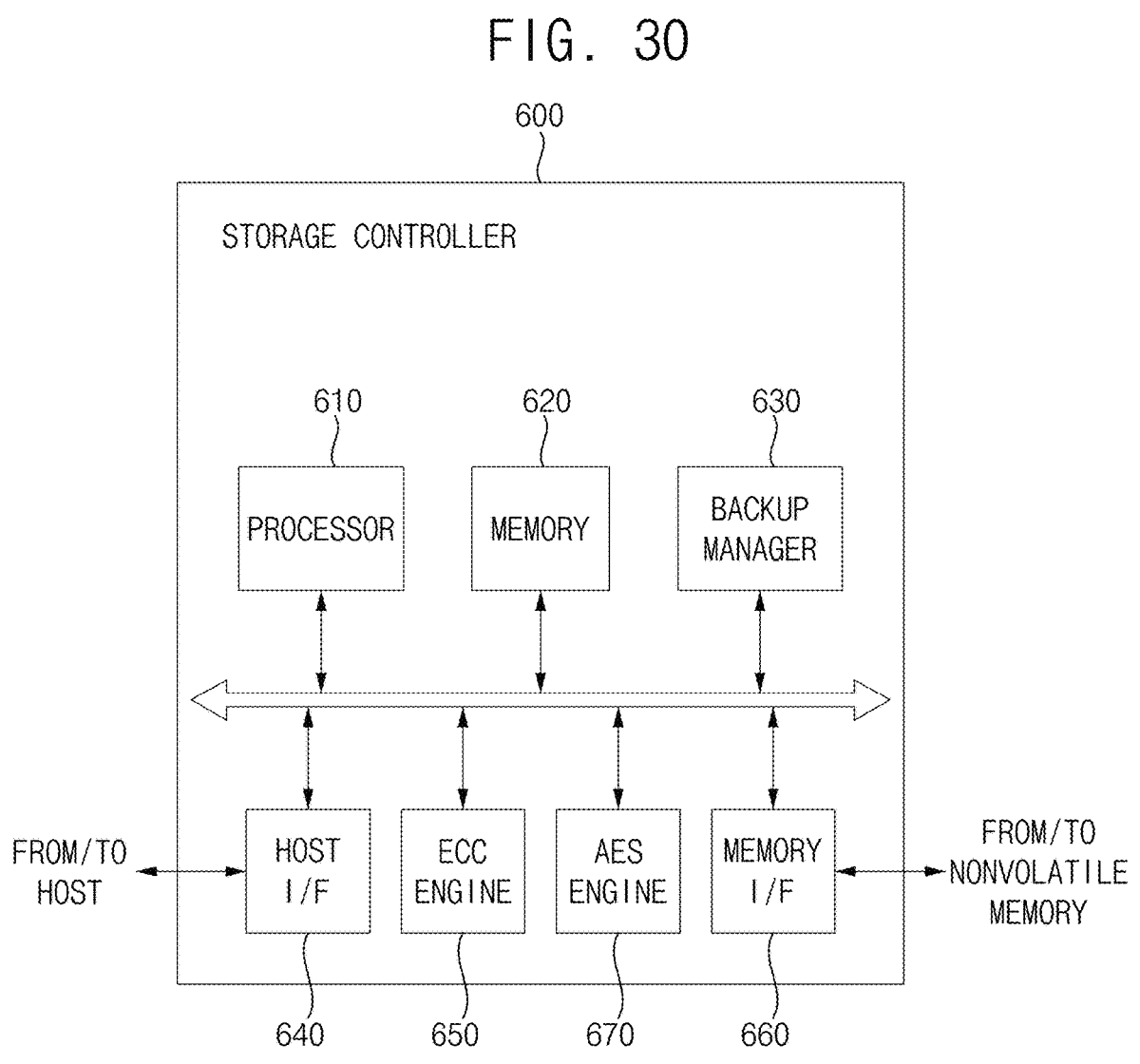

STORAGE CONTROLLER

| 610 | 620 | 630 |
|---|---|---|
| PROCESSOR | MEMORY | BACKUP MANAGER |

FROM/TO HOST

| 640 | 650 | 670 | 660 |
|---|---|---|---|
| HOST I/F | ECC ENGINE | AES ENGINE | MEMORY I/F |

FROM/TO NONVOLATILE MEMORY

STORAGE DEVICE AND STORAGE SYSTEM INCLUDING THE SAME

CROSS-REFERENCE TO RELATED APPLICATION

This application claims priority under 35 USC § 119 to Korean Patent Application No. 10-2024-0009893 filed on Jan. 23, 2024 in the Korean Intellectual Property Office (KIPO), the contents of which are herein incorporated by reference in their entirety.

BACKGROUND

1. Technical Field

Example embodiments relate generally to semiconductor integrated circuits, and more particularly to storage devices and storage systems including the storage devices.

2. Description of the Related Art

Certain types of storage devices include one or more memory devices. Examples of such storage devices include solid state drives (SSDs). These types of storage devices may have various design and/or performance advantages over hard disk drives (HDDs). Examples of potential advantages include the absence of moving mechanical parts, higher data access speed, stability, durability, and/or and low power consumption. Recently, various systems, e.g., laptops, automobiles, aircrafts, drones, etc., have adopted the SSDs for data storage.

The storage devices may be employed in various types of mobile systems. It is important to reduce power consumption in the mobile systems, and accordingly, various technologies are being studied to reduce power consumption of the storage devices and the mobile systems including the storage devices.

SUMMARY

At least one example embodiment of the present invention provides a storage device capable of efficiently reducing power consumption by setting a storage location of backup data differently depending on various operating situations.

At least one example embodiment of the present invention provides a storage system including the storage device.

According to example embodiments, a storage device includes a plurality of non-volatile memories, at least one volatile memory, and a storage controller. The storage controller controls operations of the plurality of non-volatile memories and the at least one volatile memory, and outputs leakage current information of the storage device to an external device. When the storage device enters a hibernation mode such that the storage device reduces power consumption, the storage device operates in a selected operation mode from among a plurality of operation modes based on the leakage current information. The storage device stores as a backup first backup data and second backup data in the at least one volatile memory, stores as a backup the first backup data and the second backup data in the plurality of non-volatile memories, or outputs as a backup the second backup data to the external device, depending on the selected operation mode. Prior to the entering the hibernation mode, the first backup data is stored in the external device, and the second backup data isstored in the storage device.

According to example embodiments, a storage system includes a host device including host memory, and a first storage device controlled by the host device. The first storage device includes a plurality of first non-volatile memories, at least one first volatile memory, and a first storage controller. The first storage controller controls operations of the plurality of first non-volatile memories and the at least one first volatile memory, and outputs first leakage current information on data retention of the first storage device to the host device. When the storage system enters a hibernation mode such that the storage system reduces power consumption, the host device selects one of a plurality of operation modes based on the first leakage current information and second leakage current information on data retention of the host device. The storage system stores as a backup both first backup data of the host device and second backup data of the first storage device in one of the host memory, the at least one first volatile memory and the plurality of first non-volatile memories, depending on the selected operation mode from among the plurality of operation modes.

According to example embodiments, a storage system includes a host device including a first volatile memory, and a storage device including a non-volatile memory, a second volatile memory, and a storage controller connected to the non-volatile memory and the second volatile memory. The host device and the storage device communicate with each other such that the host device and the storage device share leakage current information on data retention of the host device and the storage device. When the storage system enters a hibernation mode such that the storage system reduces power consumption, the host device selects one of a plurality of operation modes based on the leakage current information. In a first operation mode among the plurality of operation modes, the first volatile memory stores as a backup first backup data of the host device and second backup data of the storage device, the first volatile memory in the host device operates in a low power mode to retain the first and second backup data, and the storage device is powered off. In a second operation mode among the plurality of operation modes, the second volatile memory stores as a backup the first and second backup data, the host device is powered off, and the second volatile memory in the storage device operates in a low power mode to retain the first and second backup data. In a third operation mode among the plurality of operation modes, the non-volatile memory stores as a backup the first and second backup data, and both the host device and the storage device are powered off. In the third operation mode, when the storage system exits the hibernation mode, the host device and the storage device are powered on, the first backup data is transmitted to the host device and restored in the first volatile memory, the second backup data is transmitted to the second volatile memory and restored in the second volatile memory, and the transmission operation of the first backup data and the transmission operation of the second backup data are performed in preference to operations of processing data other than the first and second backup data.

In the storage devices and the storage systems according to example embodiments, when the storage devices and the storage systems enter the hibernation mode, backup data may be selectively stored as a backup in one of the host memory of the host device, the volatile memory of the storage device, or the non-volatile memory of the storage device, depending on the operation mode. The storage location of the backup data may be set differently depending on various operating situations, and thus power optimization may be efficiently performed. In addition, when the storage devices and the storage systems exit from the hibernation mode, the latest operating state immediately before entering the hibernation mode may be quickly recovered based on the hibernation flag, and thus the deterioration of operating performance may be prevented.

BRIEF DESCRIPTION OF THE DRAWINGS

Illustrative, non-limiting example embodiments will be more clearly understood from the following detailed description taken in conjunction with the accompanying drawings.

FIG. 1 is a block diagram illustrating a storage device and a storage system including the storage device according to example embodiments.

FIG. 2 is a flowchart illustrating a method of driving a storage device according to example embodiments.

FIG. 3 is a flowchart illustrating an example of setting a plurality of operation modes in FIG. 2.

FIGS. 6A and 6B are diagrams for explaining the operation of FIG. 5.

FIGS. 10A and 10B are diagrams for explaining the operation of FIG. 9.

FIGS. 14A, 14B, 15A, and 15B are diagrams for explaining the operation of FIG. 13.

FIGS. 19A and 19B are diagrams for explaining the operation of FIG. 18.

FIGS. 23A and 23B are diagrams for explaining the operation of FIG. 22.

FIGS. 26 and 27 are block diagrams illustrating a storage device and a storage system including the storage device according to example embodiments.

FIGS. 28A, 28B, 28C, and 28D are diagrams for explaining the operation of the storage device and storage system of FIG. 27.

FIG. 30 is a block diagram illustrating an example of a storage controller included in a storage device according to example embodiments.

DETAILED DESCRIPTION OF THE EMBODIMENTS

Figures 4A, 4B:
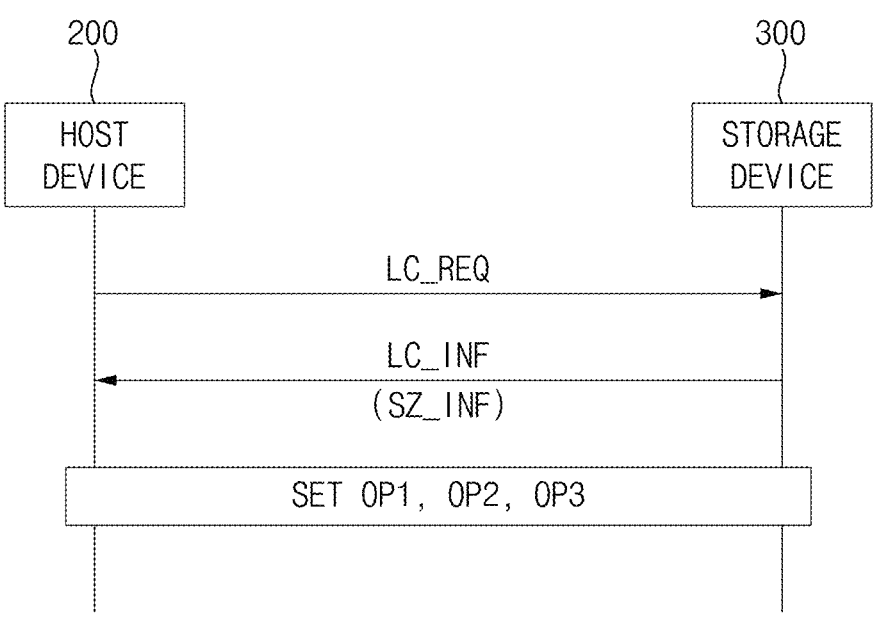
FIGS. 4A and 4B are diagrams for explaining the operation of FIG. 3.

Various example embodiments will be described more fully with reference to the accompanying drawings, in which embodiments are shown. The present invention may, however, be embodied in many different forms and should not be construed as limited to the embodiments set forth herein. Like reference numerals refer to like elements throughout this application. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
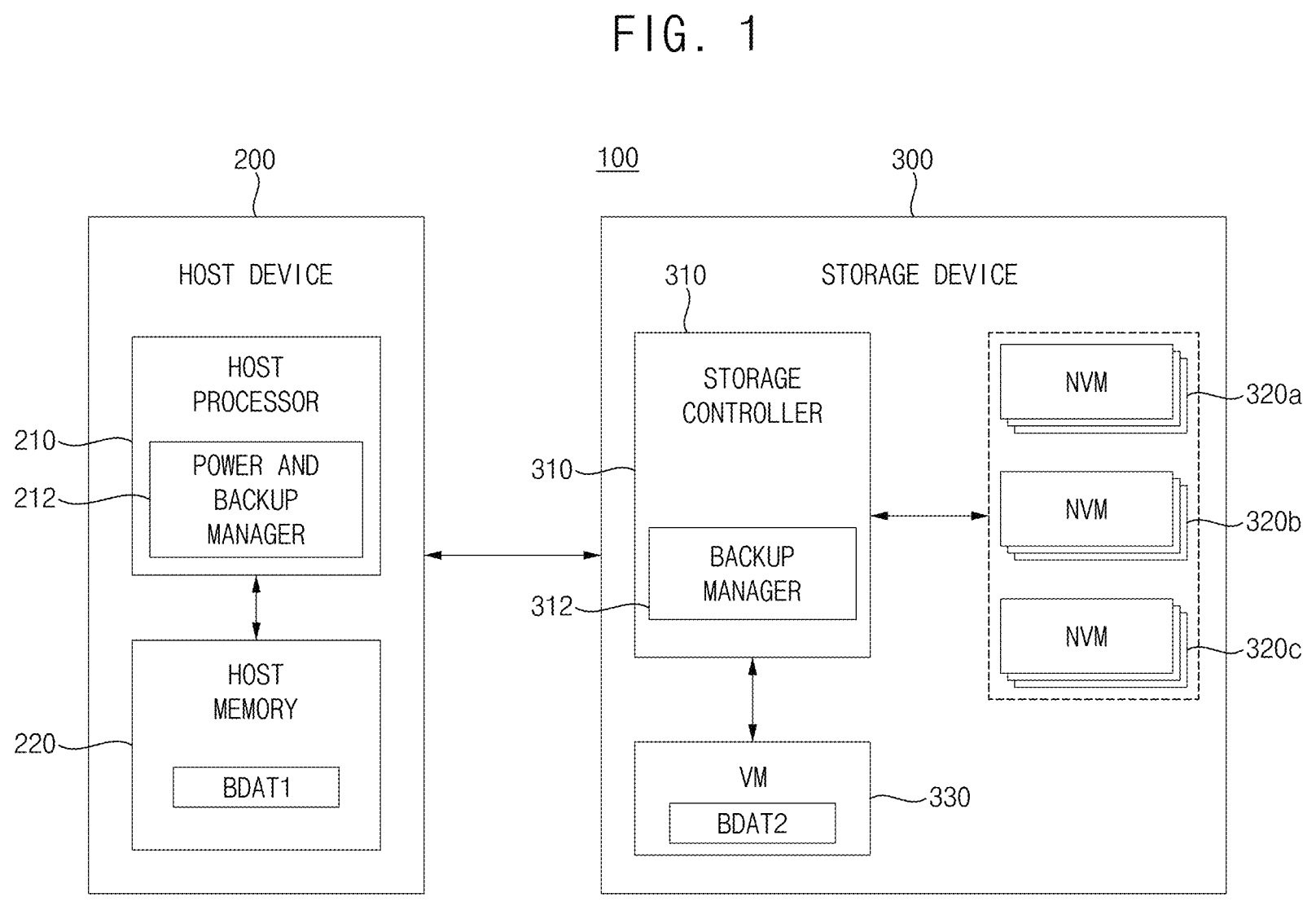

FIG. 1 is a block diagram illustrating a storage device and a storage system including the storage device according to example embodiments.

Referring to FIG. 1, a storage system 100 includes a host device 200 and a storage device 300.

The host device 200 controls the overall operation of the storage system 100. The host device 200 may include a host processor 210 and a host memory 220.

The host processor 210 may control the operation of the host device 200. For example, the host processor 210 may execute an operating system (OS). For example, the operating system may include a file system for file management and a device driver for controlling peripheral devices including the storage device 300 at the operating system level.

The host memory 220 may store instructions and data that are executed and processed by the host processor 210. For example, the host memory 220 may store first backup data BDAT1 of the host device 200 while the host device 200 is operating. The first backup data BDAT1 may be essential data and/or important data for the operation of the host device 200. Though the operation of the host device 200 is stopped or terminated (e.g., the host device 200 is powered off), the first backup data BDAT1 may need to be preserved and/or backed up for future operation when the host device 200 is restarted later.

In some example embodiments, the host memory 220 may include at least one of various volatile memories, such as a dynamic random access memory (DRAM). The host memory 220 may be referred to as a volatile memory.

The storage device 300 is accessed by the host device 200. The storage device 300 may include a storage controller 310, a plurality of non-volatile memories (NVMs) 320a, 320b, and 320c, and at least one volatile memory (VM) 330.

The storage controller 310 may control the operation of the storage device 300. For example, the storage controller 310 may control the operation of the plurality of non-volatile memories 320a to 320c based on requests (or commands) and data received from the host device 200. The storage controller 310 may be a memory controller in some examples and may be embodied as a semiconductor chip.

The plurality of non-volatile memories 320a to 320c may be controlled by the storage controller 310 and may store a plurality of data such as metadata and various user data.

In some example embodiments, each of the plurality of non-volatile memories 320a to 320c may be a NAND flash memory. In other example embodiments, each of the plurality of non-volatile memories 320a to 320c may be a phase-change random access memory (PRAM), a resistive random access memory (RRAM), a magnetic random access memory (MRAM), and ferroelectric random access memory (FRAM). Each of the plurality of non-volatile memories 320a to 320c may be embodied as a semiconductor chip.

The volatile memory 330 may store commands and data executed and processed by the storage controller 310, and may temporarily store data stored in or to be stored in the plurality of non-volatile memories 320a to 320c. For example, the volatile memory 330 may store second backup data BDAT2 of the storage device 300 while the storage device 300 is operating. The second backup data BDAT2 is essential data and/or important data for the operation of the storage device 300, and is preserved and/or backed up for future operation when the storage device 300 is stopped, such as being powered off.

In some example embodiments, the volatile memory 330 may be a static random access memory (SRAM) or a DRAM, for example. The volatile memory 330 may be embodied as a semiconductor chip.

To perform operations related to or associated with a hibernation mode to reduce power consumption according to example embodiments, the host processor 210 may include a power and backup manager 212, and the storage controller 310 may include a backup manager 312. The hibernation mode may be referred to as a sleep mode, a low power mode, etc.

For example, at the beginning of operation, the backup manager 312 may provide leakage current information of the storage device 300 on data retention (i.e., the ability to retain the stored data for a period of time without/with supplying power) of the storage device 300 to the power and backup manager 212, and the power and backup manager 212 may set a plurality of operation modes in the hibernation mode based on leakage current information of the host device 200 on data retention of the host device 200 and the leakage current information of the storage device 300.

For example, the power and backup manager 212 may control an operation of entering into the hibernation mode and an operation of exiting from the hibernation mode. When entering the hibernation mode, the power and backup manager 212 may select one of the plurality of operation modes based on the leakage current information and operating situation.

For example, in the hibernation mode, the power and backup manager 212 and/or the backup manager 312 may selectively store as a backup the first and second backup data BDAT1 and BDAT2 in one of the host memory 220 of the host device 200, the volatile memory 330 of the storage device 300, and the non-volatile memories 320a to 320c of the storage device 300, depending on the selected operation mode among the plurality of operation modes. In other words, the storage location of the backup data BDAT1 and BDAT2 may be set differently depending on the operation mode. As referenced herein, "store as a backup" may include storing data, which is stored in a component before entering a hibernation mode, in a separate memory device to retain the data during a period in which a component loses its ability to retain the data for a period of time or power is not provided to the component. Further, "output as a backup," "receive as a backup" or "transmit as a backup" may comprise moving data from a component, where the data is stored before entering a hibernation mode, to a separate memory device to retain the data during a period in which a component loses its ability to retain the data for a period of time or power is not provided to the component.

For example, when exiting the hibernation mode, the power and backup manager 212 and/or the backup manager 312 may restore the first and second backup data BDAT1 and BDAT2, and may recover the operating state of the host device 200 and/or the storage device 300.

Detailed operations related to the hibernation mode will be described with reference to FIGS. 2 to 25.

In some example embodiments, some or all of the power and backup manager 212 and the backup manager 312 may be implemented in the form of hardware. For example, some or all of the power and backup manager 212 and the backup manager 312 may be included in a computer-based electronic system. In other example embodiments, some or all of the power and backup manager 212 and the backup manager 312 may be implemented in software, for example, in the form of instruction codes or program routines. For example, the instruction codes or program routines may be executed by a computer-based electronic system and may be stored in an arbitrary storage located inside or outside the computer-based electronic system.

In some example embodiments, the storage device 300 may be a solid state drive (SSD), a universal flash storage (UFS), a MultiMediaCard (MMC), or an embedded MMC (eMMC). In other example embodiments, the storage device 300 may be implemented as a secure digital (SD) card, a micro SD card, a memory stick, a chip card, a universal serial bus (USB) card, a smart card, a compact flash (CF) card, or the like.

In some example embodiments, the storage device 300 may be connected to the host device 200 through a block accessible interface including a serial advanced technology attachment (SATA) bus, a small computer small interface (SCSI) bus, a non-volatile memory express (NVMe) bus, a serial attached SCSI (SAS) bus, a UFS, and an eMMC, and may be accessed in block units by the host device 200 through the block accessible interface.

In some example embodiments, the storage system 100 may be at least one of various mobile systems such as a mobile phone, a smart phone, a tablet, a personal computer (PC), a laptop computer, a personal digital assistant (PDA), a portable multimedia player (PMP), a digital camera, a camcorder, a portable game console, a music player, a video player, a navigation device, a wearable device, an internet of things (IoT) device, an e-book, a virtual reality (VR) device, an augmented reality (AR) device, a drone, or an automotive. However, example embodiments are not limited thereto, and the storage system 100 may be at least one of various computing systems such as a personal computer (PC), a server computer, a data center, a workstation, a digital television (TV), or a set-top box.

FIG. 2 is a flowchart illustrating a method of driving a storage device according to example embodiments.

Referring to FIG. 2, a method of driving a storage device according to example embodiments is performed by the storage device controlled by a host device. For example, the host device and the storage device may be implemented as described with reference to FIG. 1.

In the method of driving the storage device according to the example embodiments, a plurality of operation modes in a hibernation mode are set based on leakage current information of the host device and the storage device (operation S100). For example, S100 may be performed by the power and backup manager 212 and the backup manager 312 in FIG. 1. For example, S100 may not be performed independently by the storage device, and the storage device may perform at least a part of S100.

When entering the hibernation mode, backup data of the host device and the storage device are stored as a backup depending on an operation mode selected from among the plurality of operation modes (operation S200). For example, the storage location of the backup data may be changed depending on the selected operation mode. For example, S200 may be performed by the backup manager 312 in FIG. 1.

When exiting from the hibernation mode, the backup data is restored depending on the selected operation mode (operation S300). For example, S300 may be performed by the backup manager 312 in FIG. 1.

An example of S100 will be described with reference to FIGS. 3, 4A and 4B, and examples of S200 and S300 depending on the operation mode will be described with reference to FIGS. 5 to 25.

In some example embodiments, the operation of FIG. 2 may be explained as a method of driving a storage system including the host device and the storage device. For example, the storage system may perform all of S100, S200, and S300, and S200 and S300 may be performed by the power and backup manager 212 and the backup manager 312 in FIG. 1.

FIG. 3 is a flowchart illustrating an example of setting a plurality of operation modes in FIG. 2. FIGS. 4A and 4B are diagrams for explaining an operation of FIG. 3.

Referring to FIGS. 2, 3, 4A, and 4B, in S100, the storage device 300 may output leakage current information LC_INF on data retention (operation S110). For example, the host device 200 may transmit a leakage current request LC_REQ to the storage device 300. The storage device 300 may output the leakage current information LC_INF in response to the leakage current request LC_REQ, and transmit the leakage current request LC_REQ to the host device 200. For example, S110 may be performed by the backup manager 312 in FIG. 1.

In some example embodiments, the leakage current information LC_INF of the storage device 300 may indicate the certain amount of leakage current required to retain the stored data in the volatile memory 330 included in the storage device 300 in the hibernation mode. For example, the certain amount of leakage current may relate to a minimum amount of leakage current required to retain the stored data in the volatile memory 330 included in the storage device 300 in the hibernation mode.

In some example embodiments, size information SZ_INF for the data retention may be output together with the leakage current information LC_INF and transmitted to the host device 200. For example, the size information SZ_INF may indicate the storage capacity of the volatile memory 330 included in the storage device 300.

Based on the leakage current information LC_INF of the storage device 300 and the leakage current information of the host device 200, a first operation mode OP1, a second operation mode OP2, and a third operation mode OP3 that are different from each other may be set in the hibernation mode (operation S120). That is, the plurality of operation modes may include the first operation mode OP1, the second operation mode OP2, and the third operation mode OP3. For example, S120 may be performed by the power and backup manager 212 in FIG. 1.

In some example embodiments, similar to the leakage current information LC_INF of the storage device 300, the leakage current information of the host device 200 may indicate the minimum amount of leakage current required to retain the stored data in the host memory 220 included in the host device 200 in the hibernation mode (e.g., a significantly less amount of leakage current than that of in a normal mode).

In some example embodiments, S110 and S120 may be performed at the beginning of operation of the storage system 100. For example, S110 and S120 may be performed when the storage device 300 is first equipped with the storage system 100, and when the host device 200 and the storage device 300 are electrically connected for the first time.

In some example embodiments, as illustrated in FIG. 4B, the first operation mode OP1 may be an operation mode in which the host device 200 consumes only power required to retain the stored data therein and the storage device 300 is powered off, the second operation mode OP2 may be an operation mode in which the host device 200 is powered off and the storage device 300 consumes only power required to retain the stored data therein, and the third operation mode OP3 may be an operation mode in which the both host device 200 and the storage device 300 are powered off.

For example, in the first operation mode OP1, both the first backup data BDAT1 of the host device 200 and the second backup data BDAT2 of the storage device 300 may be stored as a backup in the host memory 220 of the host device 200. As described above, since the host memory 220 is a volatile memory, the host memory 220 may operate in a low power mode for retaining the first and second backup data BDAT1 and BDAT2. Additionally, to reduce power consumption, components (e.g., the host processor 210, etc.) of the host device 200 other than the host memory 220 may be disabled, and the storage device 300 may be powered off.

In the second operation mode OP2, the first and second backup data BDAT1 and BDAT2 may be stored as a backup in the volatile memory 330 of the storage device 300, and the volatile memory 330 may operate in a low power mode for retaining the first and second backup data BDAT1 and BDAT2. Additionally, to reduce power consumption, components (e.g., the storage controller 310 and the non-volatile memories 320a to 320c) in the storage device 300 other than the volatile memory 330 may be disabled, and the host device 200 may be powered off.

In the third operation mode OP3, the first and second backup data BDAT1 and BDAT2 may be stored as a backup in the non-volatile memories 320a to 320c of the storage device 300. Since the non-volatile memories 320a to 320c do not lose data even if the power supply is stopped, power supply may not be required to retain the first and second backup data BDAT1 and BDAT2, and thus the both host device 200 and storage device 300 may be powered off.

In some example embodiments, the host device 200 may select and/or determine an efficient operation mode in the hibernation mode based on the amount of leakage current of (i.e., induced by) the host memory 220, the amount of leakage current of the volatile memory 330, and the amount of total leakage current of the storage system 100.

For example, when the amount of leakage current of the host memory 220 is less than the amount of leakage current of the volatile memory 330, it may be more efficient (e.g., the power consumption may be reduced) to drive the host memory 220 to store as a backup the first and second backup data BDAT1 and BDAT2. Therefore, in this case, the first operation mode OP1 may be selected in the hibernation mode.

For example, when the amount of leakage current of the volatile memory 330 is less than the amount of leakage current of the host memory 220, it may be more efficient to drive the volatile memory 330 to store as a backup the first and second backup data BDAT1 and BDAT2. Therefore, in this case, the second operation mode OP2 may be selected in the hibernation mode.

For example, when the amount of total leakage current of the storage system 100 is greater than the amount of reference current, it may be necessary to further reduce the power consumption, and it may be more efficient to store as a backup the first and second backup data BDAT1, BDAT2 in non-volatile memories 320a to 320c without driving the host memory 220 and volatile memory 330. Therefore, in this case, the third operation mode OP3 may be selected in the hibernation mode.

In some example embodiments, the size information SZ_INF may be additionally used to select and/or determine an operation mode in the hibernation mode. For example, when the size of the first and second backup data BDAT1 and BDAT2 is larger than the storage capacity of the volatile memory 330, the second operation mode OP2 may not be selected.

In some example embodiments, information related to a duration of the hibernation mode may be additionally used to select and/or determine an operation mode in the hibernation mode. For example, when the duration of the hibernation mode is relatively short (e.g., shorter than a reference time interval), one of the first and second operation modes OP1 and OP2 may be selected. For example, when the duration of the hibernation mode is relatively long (e.g., longer than the reference time interval), the third operation mode OP3 may be selected.

Operations in the first operation mode OP1 will be described with reference to FIGS. 5 to 12, operations in the second operation mode OP2 will be described with reference to FIGS. 13 to 17, and operations in the third operation mode OP) will be described with reference to FIGS. 18 to 25.

Figure 5:
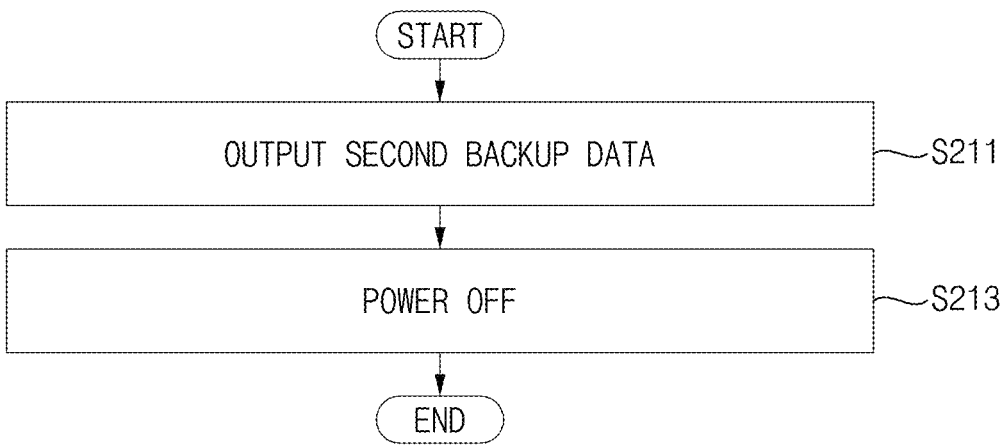
FIG. 5 is a flowchart illustrating an example of storing backup data when entering the hibernation mode of FIG. 2.
Figure 6A:
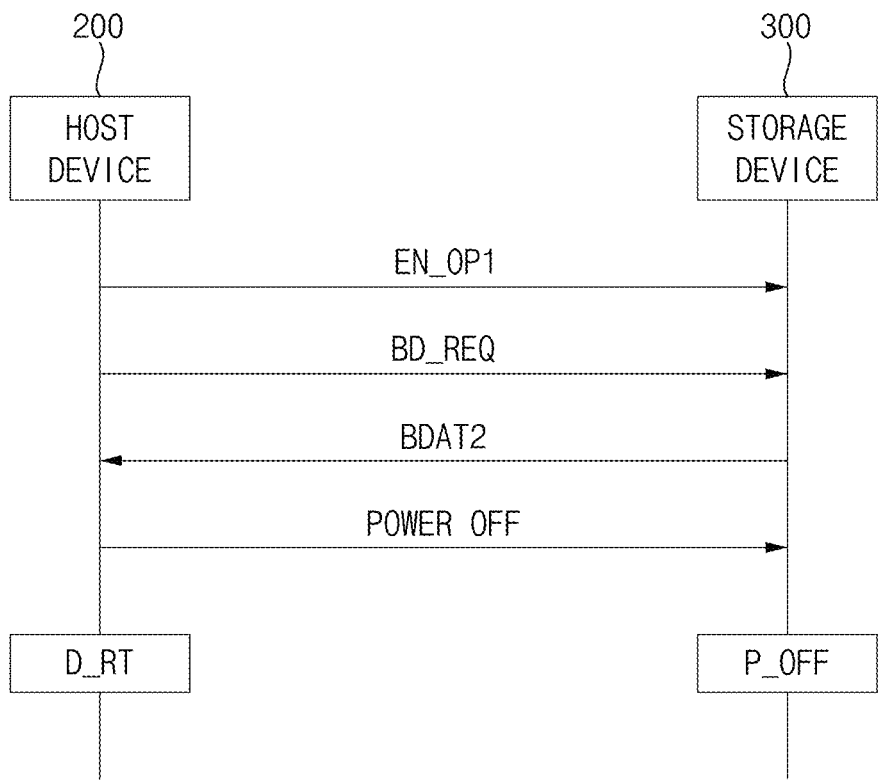
Figure 6B:
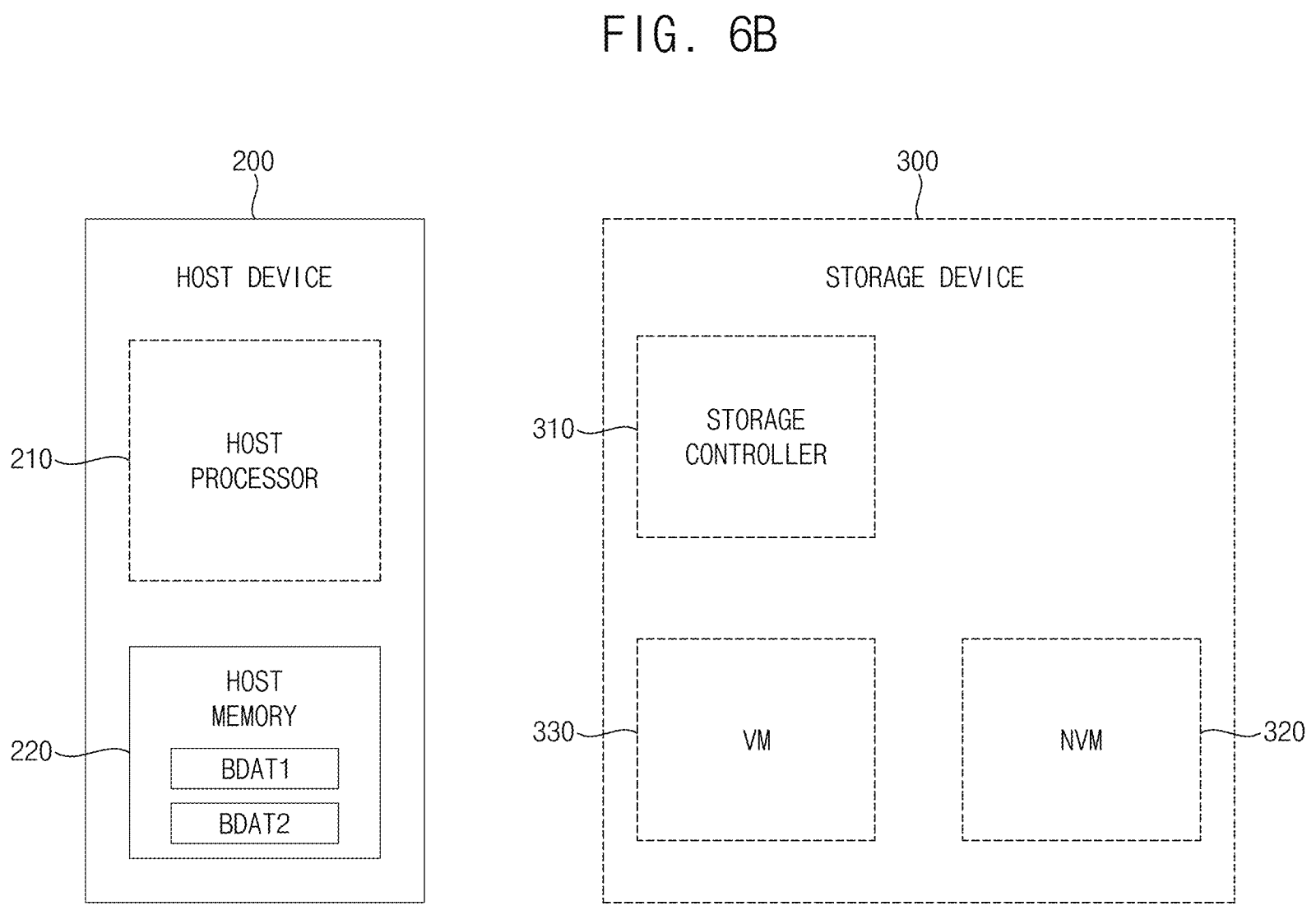

FIG. 5 is a flowchart illustrating an example of storing backup data when entering the hibernation mode of FIG. 2. FIGS. 6A and 6B are diagrams for explaining the operation of FIG. 5.

Referring to FIGS. 2, 5, 6A, and 6B, in S200, an example of the operations in the first operation mode OP1, e.g., an example of storing the first and second backup data BDAT1 and BDAT2 in the host memory 220 of the host device 200, is illustrated.

For example, the storage device 300 may output as a backup the second backup data BDAT2 when entering the hibernation mode and the first operation mode OP1 (operation S211). For example, the host device 200 may transmit a first entry request EN_OP1 to the storage device 300 to enter the hibernation mode and the first operation mode OP1, and the storage device 300 may prepare the second backup data BDAT2. For example, the host device 200 may transmit a backup data request BD_REQ to the storage device 300, and the storage device 300 may output the second backup data BDAT2 and may transmit as a backup to the host device 200 in response to the backup data request BD_REQ. For example, as illustrated in FIG. 6B, the second backup data BDAT2 transmitted to the host device 200 may be stored in the host memory 220 together with the first backup data BDAT1. For example, S211 may be performed by the backup manager 312 in FIG. 1.

After transmitting the second backup data BDAT2 to the host device 200, the storage device 300 may be powered off (operation S213). For example, the host device 200 may block or cut off the power supplied to the storage device 300, and the storage device 300 may be in a power-off state P_OFF. In FIG. 6B, all of the storage device 300 and the components 310, 320, and 330 having the power-off state P_OFF are illustrated by dotted lines.

In some example embodiments, the host device 200 may have a data retention state D_RT to retain the first and second backup data BDAT1 and BDAT2 while consuming minimal (or substantially low) power. For example, in the host device 200, only the host memory 220 may operate in the low power mode and the host processor 210 may be disabled. For example, unlike the power off state P_OFF, the data retention state D_RT or the low power mode may indicate that power is supplied and a clock signal is turned off. In FIG. 6B, the disabled host processor 210 is illustrated by a dotted line, and the host memory 220 operating in the low power mode and the host device 200 having the data retention state D_RT are illustrated by solid lines.

In some example embodiments, only a portion of the host processor 210 is disabled, and components for exiting the hibernation mode (e.g., the power and backup manager 212 in FIG. 1) may maintain an enabled state.

Figure 7:
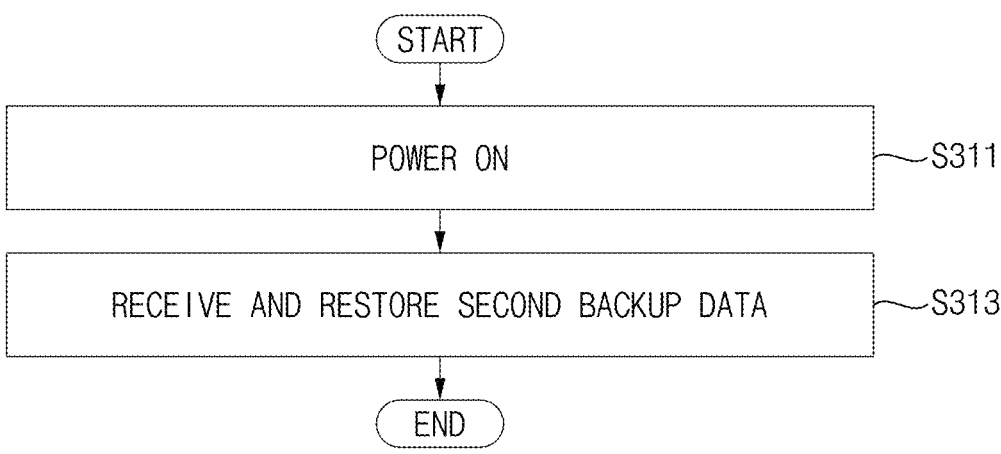
FIG. 7 is a flowchart illustrating an example of restoring backup data when exiting the hibernation mode of FIG. 2.
Figure 8:
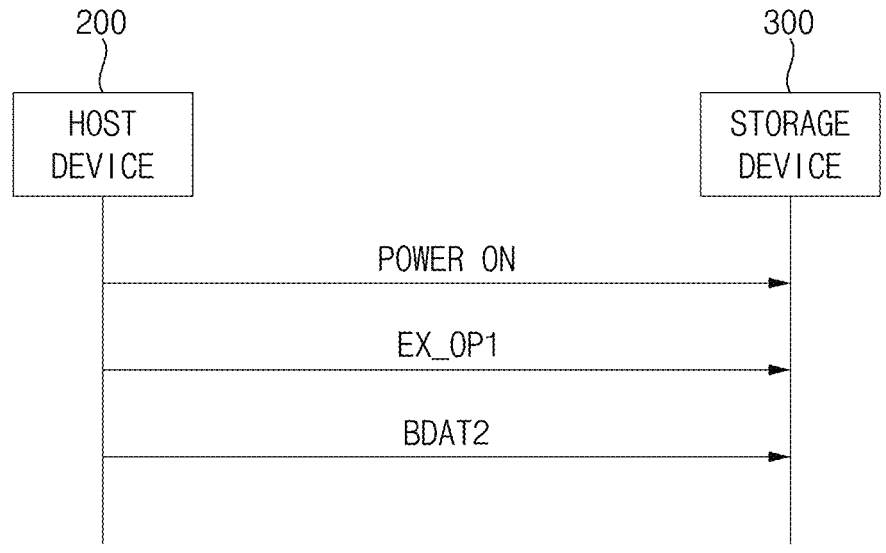
FIG. 8 is a diagram for explaining the operation of FIG. 7.

FIG. 7 is a flowchart illustrating an example of restoring backup data when exiting the hibernation mode of FIG. 2. FIG. 8 is a diagram for explaining the operation of FIG. 7.

Referring to FIGS. 2, 7, and 8, in S300, an example of the operations in the first operation mode OP1 corresponding to FIG. 5, e.g., an example of restoring the second backup data BDAT2 in the volatile memory 330 of the storage device 300, is illustrated.

In some example embodiments, the storage device 300 may be powered on to exit the hibernation mode and the first operation mode OP1 (operation S311). For example, the host device 200 may supply power to the storage device 300 and transmit a first exit request EX_OP1 to the storage device 300 to exit the hibernation mode and the first operation mode OP1. The first exit request EX_OP1 may be referred to as a wakeup request and/or signal.

After being powered on, the storage device 300 may receive the second backup data BDAT2 and restore the second backup data BDAT2 (operation S313). For example, the host device 200 may transmit the second backup data BDAT2 to the storage device 300, the storage device 300 may receive the second backup data BDAT2, and the received second backup data BDAT2 may be restored in the volatile memory 330. For example, S313 may be performed by the backup manager 312 in FIG. 1.

Accordingly, as illustrated in FIG. 1, the storage device 300 and the host device 200 may operate in the same state as before entering the hibernation mode.

Figure 9:
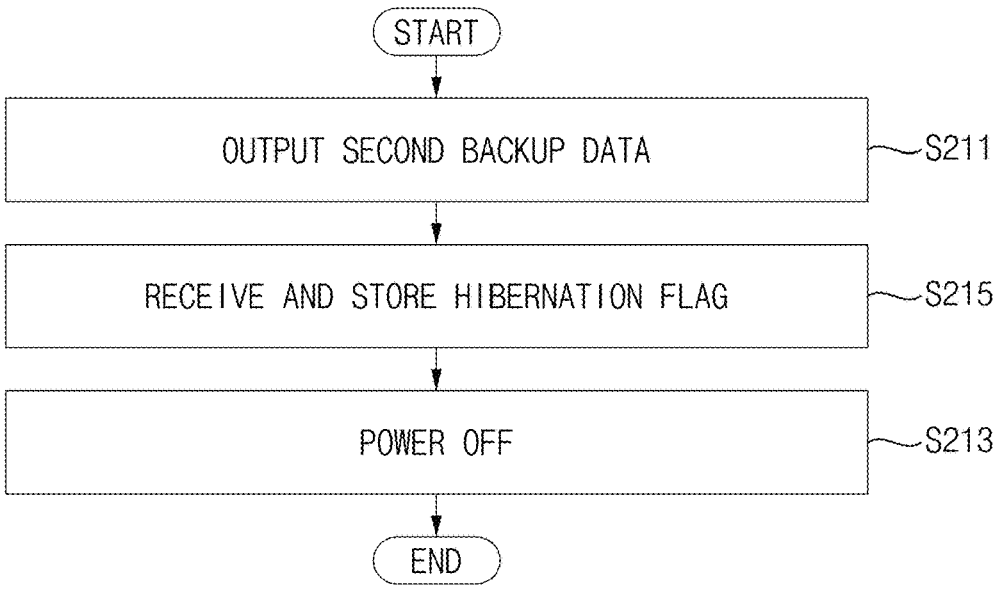
FIG. 9 is a flow chart illustrating an example of storing backup data when entering the hibernation mode of FIG. 2.
Figure 10A:
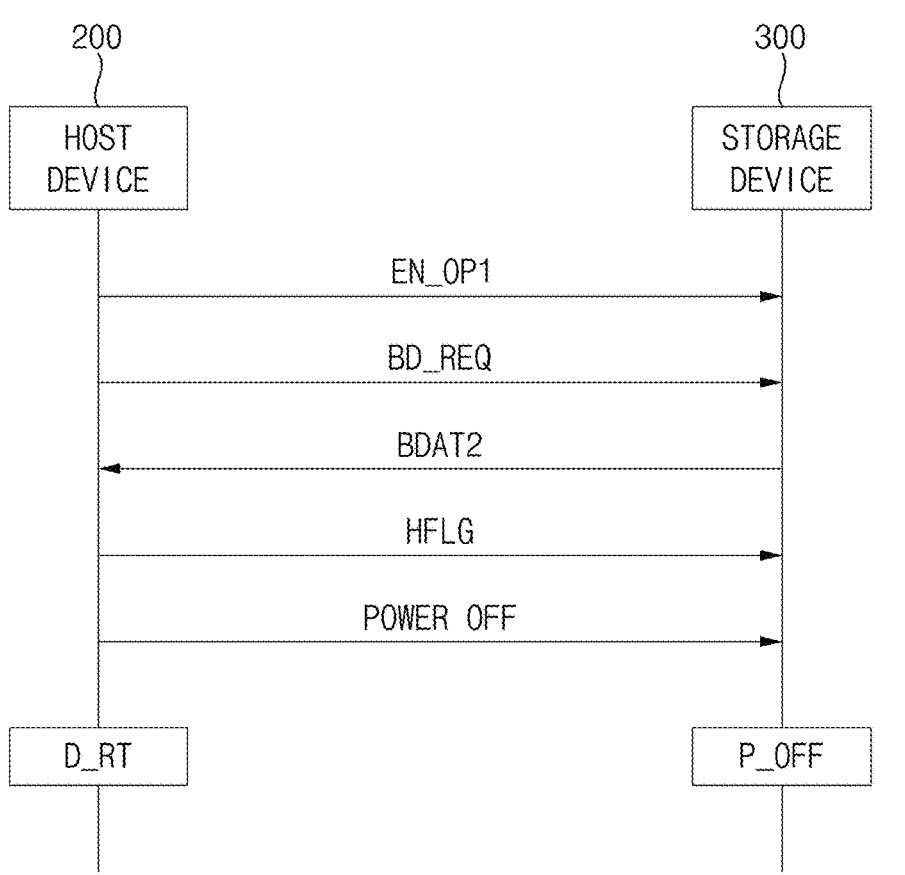

FIG. 9 is a flowchart illustrating an example of storing backup data when entering the hibernation mode of FIG. 2. FIGS. 10A and 10B are diagrams for explaining the operation of FIG. 9.

Referring to FIGS. 2, 9, 10A, and 10B, in S200, an example of the operations in the first operation mode OP1, e.g., an example of storing the first and second backup data BDAT1 and BDAT2 in the host memory of the host device 200, is illustrated. S211 and S213 in FIG. 9 may be substantially the same as S211 and S213 in FIG. 5, respectively, and descriptions repeated with or overlapping with descriptions of FIGS. 5, 6A, and 6B will be omitted in the interest of brevity.

In the first operation mode OP1, after the storage device 300 transmits the second backup data BDAT2 to the host device 200, and before being powered off (e.g., after S211 and before S213), the storage device 300 may receive a hibernation flag HFLG from the host device 200 and store the hibernation flag HFLG (operation S215). The hibernation flag HFLG may be a specific indicator (or signal, or value of a register) denoting that a system or device needs to enter, is entering, or has entered hibernation mode. The hibernation flag HFLG may also contain additional information about the system's or device's most recent operating state before entering hibernation mode. For example, The hibernation flag HFLG (i.e., the operating state information) may correspond to the latest operating state (e.g., the operating state immediately before entering the hibernation mode). For example, to retain the hibernation flag HFLG even after the storage device 300 is powered off, the hibernation flag HFLG may be stored in the non-volatile memory 320 of the storage device 300, as illustrated in FIG. 10B. For example, S215 may be performed by the backup manager 312 in FIG. 1.

Figure 11:
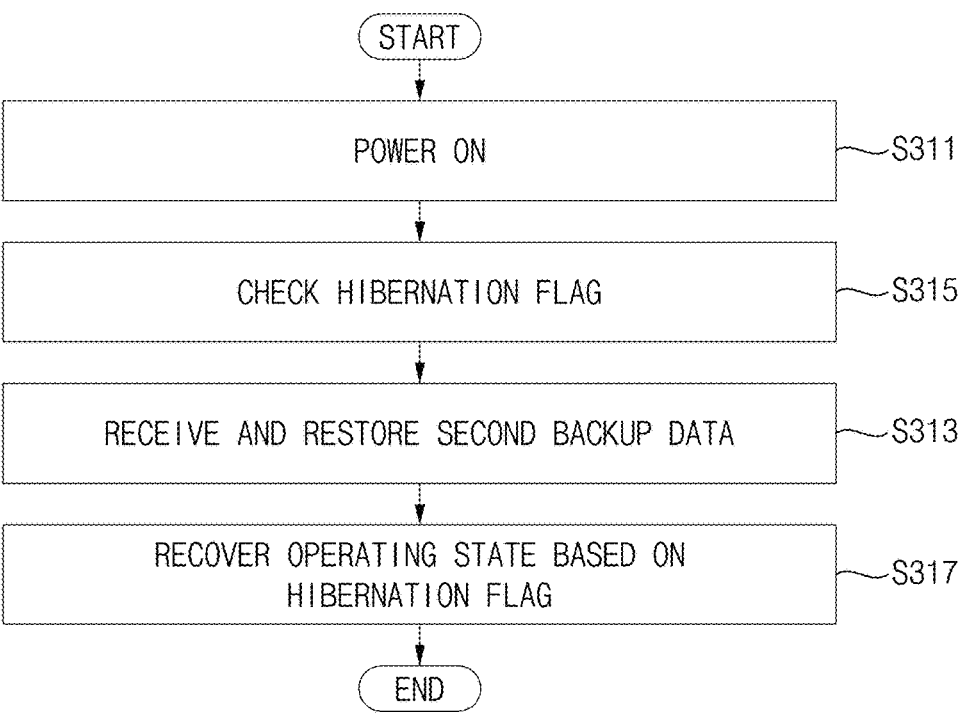
FIG. 11 is a flowchart illustrating an example of restoring backup data when exiting the hibernation mode of FIG. 2.
Figure 12:
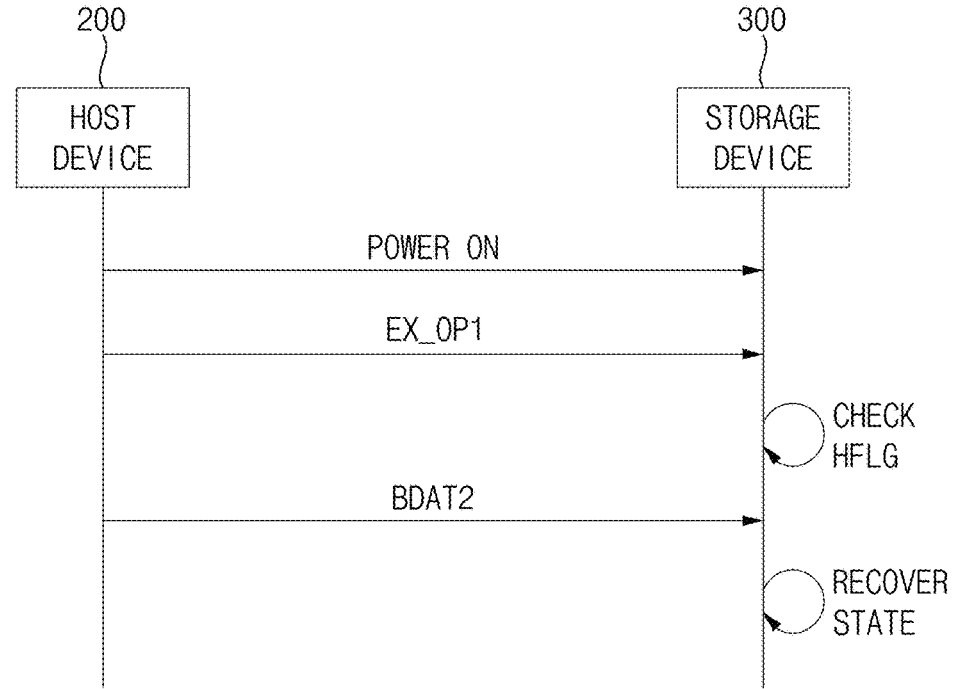
FIG. 12 is a diagram for explaining the operation of FIG. 11.

FIG. 11 is a flowchart illustrating an example of restoring backup data when exiting the hibernation mode of FIG. 2. FIG. 12 is a diagram for explaining the operation of FIG. 11.

FIGS. 2, 11, and 12, in S300, an example of the operations in the first operation mode OP1 corresponding to FIG. 9, e.g., an example of restoring the second backup data BDAT2 in the volatile memory 330 of the storage device 300, is illustrated. S311 and S313 in FIG. 11 may be substantially the same as S311 and S313 in FIG. 7, respectively, and descriptions repeated with or overlapping with descriptions of FIGS. 7 and 8 will be omitted in the interest of brevity.

In the first operation mode OP1, after or while the storage device 300 is powered on (e.g., after or during S311), the storage device 300 may check the hibernation flag HFLG stored in the non-volatile memory 320 (operation S315). For example, S315 may be performed by the backup manager 312 in FIG. 1.

After the storage device 300 receives as a backup the second backup data BDAT2 and restores the second backup data BDAT2 (e.g., after S313), the storage device 300 may recover an operating state of the storage device based on the hibernation flag HFLG such that the operating state of the storage device corresponds to the latest operating state (e.g., the operating state immediately before entering the hibernation mode) (operation S317). For example, S317 may be performed by the backup manager 312 in FIG. 1.

In general, when the storage device is powered on, the storage device may operate according to a boot sequence based on a boot loader and/or boot code. The boot loader and/or boot code may be a set of instructions that are executed when operation of the storage device and the storage system including the storage device begins. When the boot code is executed, the storage system may be prepared to run an operating system.

In contrast, the operation of powering on the storage device 300 in S311 may be a power-on operation for exiting the hibernation mode, unlike the general power-on operation described above. When the storage device operates according to the boot sequence in the power-on operation for exiting the hibernation mode, a time interval to exit the hibernation mode may increase. Accordingly, when the storage device 300 is powered off, the storage device 300 may receive the hibernation flag HFLG and store the hibernation flag HFLG as in S215. In addition, when the storage device 300 is powered on, the storage device 300 may not operate according to the boot sequence, and may recover the operating state immediately before entering the hibernation mode based on the hibernation flag HFLG as in S315 and S317, thereby reducing the time interval to exit the hibernation mode.

Figure 13:
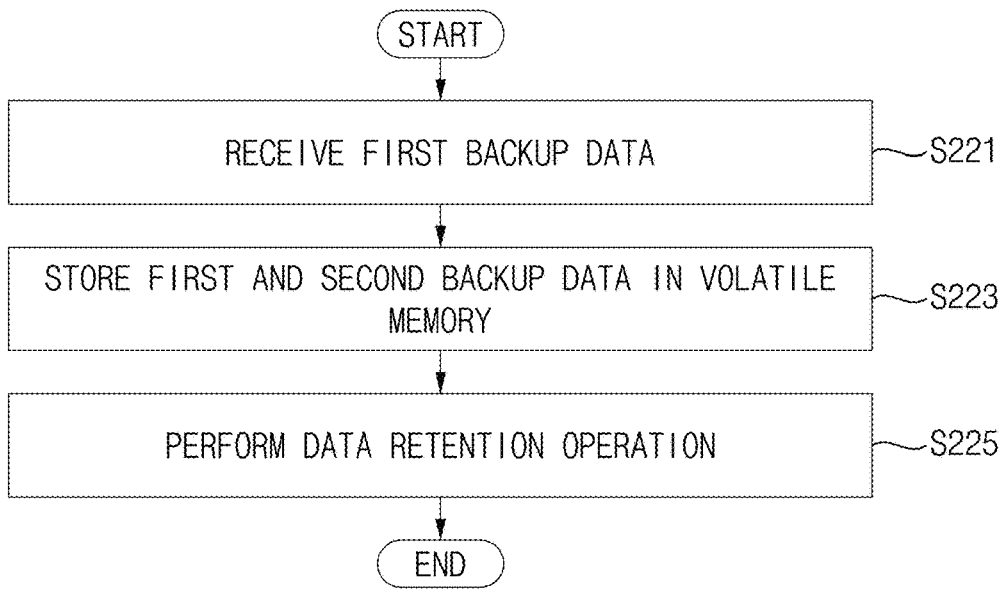
FIG. 13 is a flowchart illustrating an example of storing backup data when entering the hibernation mode of FIG. 2.
Figure 14A:
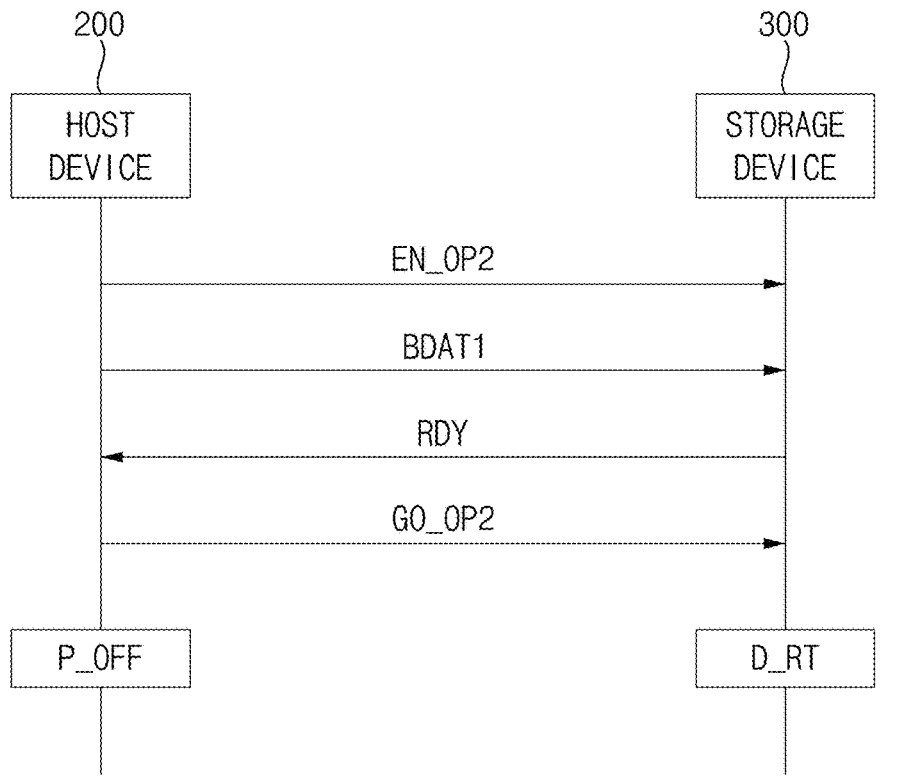

FIG. 13 is a flowchart illustrating an example of storing backup data when entering the hibernation mode of FIG. 2. FIGS. 14A, 14B, 15A, and 15B are diagrams for explaining the operation of FIG. 13.

Referring to FIGS. 2, 13, 14A, 14B, 15A, and 15B, in S200, an example of the operations in the second operation mode OP2, e.g., an example of storing the first and second backup data BDAT1 and BDAT2 in the volatile memory 330 of the storage device 300 is illustrated.

In some example embodiments, the storage device 300 may receive the first backup data BDAT1 when entering the hibernation mode and the second operation mode OP2 (operation S221). For example, the host device 200 may transmit a second entry request EN_OP2 to the storage device 300 to enter the hibernation mode and the second operation mode OP2, the host device 200 may transmit the first backup data BDAT1 to the storage device 300, and the storage device 300 may receive the first backup data BDAT1. For example, S221 may be performed by the backup manager 312 in FIG. 1.

Figure 14B:
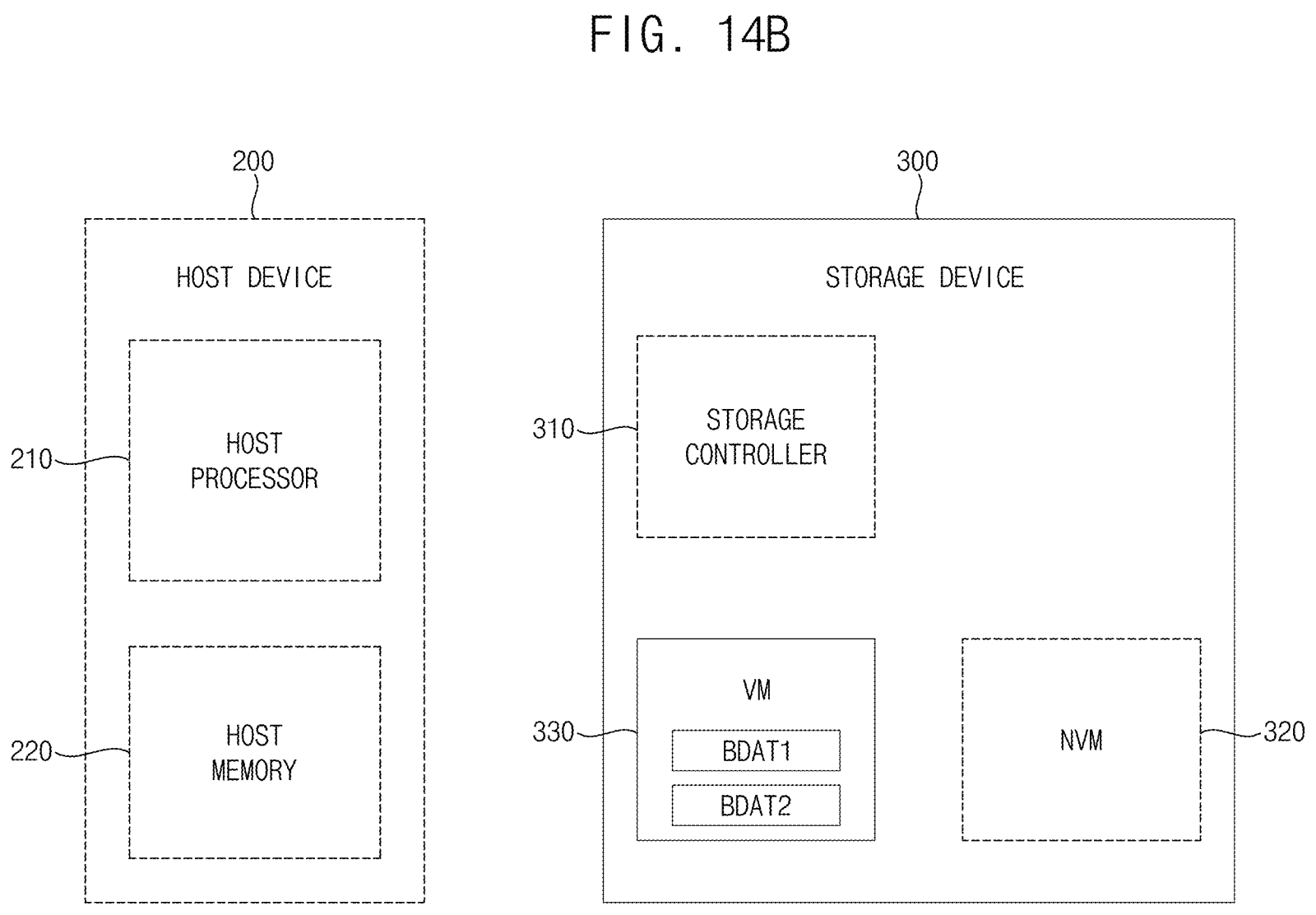

After receiving the first backup data BDAT1, the storage device 300 may store the first and second backup data BDAT1 and BDAT2 in the volatile memory 330 (operation S223). For example, as illustrated in FIG. 14B, the first backup data BDAT1 transmitted to the storage device 300 may be stored in the volatile memory 330 together with the second backup data BDAT2. For example, S223 may be performed by the backup manager 312 in FIG. 1.

After storing the first and second backup data BDAT1 and BDAT2 in the volatile memory 330, the storage device 300 may perform a data retention operation (operation S225). For example, the storage device 300 may transmit a ready signal RDY indicating that the first backup data BDAT1 has been successfully stored to the host device 200, and the host device 200 may transmit a request GO_OP2 for proceeding to the second operation mode OP2 to the storage device 300, and the storage device 300 may have the data retention state D_RT to retain the first and second backup data BDAT1 and BDAT2 while consuming minimal power or power less than that in the normal mode. For example, in the storage device 300, only the volatile memory 330 may operate in the low power mode, and the storage controller 310 and the non-volatile memory 320 may be disabled. In FIG. 14B, the disabled storage controller 310 and non-volatile memory 320 are illustrated by a dotted line, and the volatile memory 330 operating in the low power mode and the storage device 300 having the data retention state D_RT are illustrated by a solid line.

In some example embodiments, the host device 200 may be powered off. For example, the power supplied to the host device 200 may be blocked or cut off, and the host device 200 may be in the power-off state P_OFF. In FIG. 14B, the host device 200 and the components 210 and 220 in the power-off state P_OFF are all illustrated by dotted lines.

In some example embodiments, only the host memory 220 may be powered off, and some or all of the host processor 210 may not be powered off. For example, components for exiting the hibernation mode (e.g., the power and backup manager 212 in FIG. 1) may maintain an enabled state without being powered off.

Figures 15A, 15B:
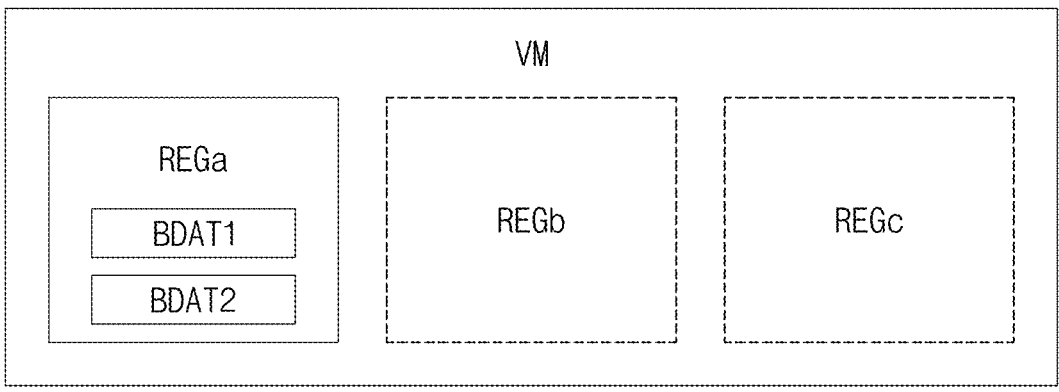

In some example embodiments, as illustrated in FIG. 15A, the storage device 300 may include a plurality of volatile memories VMa, VMb, and VMc. In the second operation mode OP2, only some of the plurality of volatile memories VMa, VMb, and VMc may be enabled. For example, the volatile memory VMa may be enabled to store and retain the first and second backup data BDAT1 and BDAT2, and the volatile memories VMb and VMc may be disabled to reduce power consumption. For example, the second backup data BDAT2 may be essential and/or important data for the operation of the storage device 300 among the data stored in the volatile memories VMa, VMb, and VMc.

In some example embodiments, as illustrated in FIG. 15B, a volatile memory VM of the storage device 300 may include a plurality of regions REGa, REGb, REGc. In the second operation mode OP2, only some of the plurality of regions REGa, REGb, REGc may be enabled. For example, the region REGa of the volatile memory VM may be enabled to store and retain the first and second backup data BDAT1 and BDAT2, and the regions REGb and REGc may be disabled to reduce power consumption. For example, the second backup data BDAT2 may be essential and/or important data for the operation of the storage device 300 among the data stored in the areas REGa, REGb, and REGc.

Figure 16:
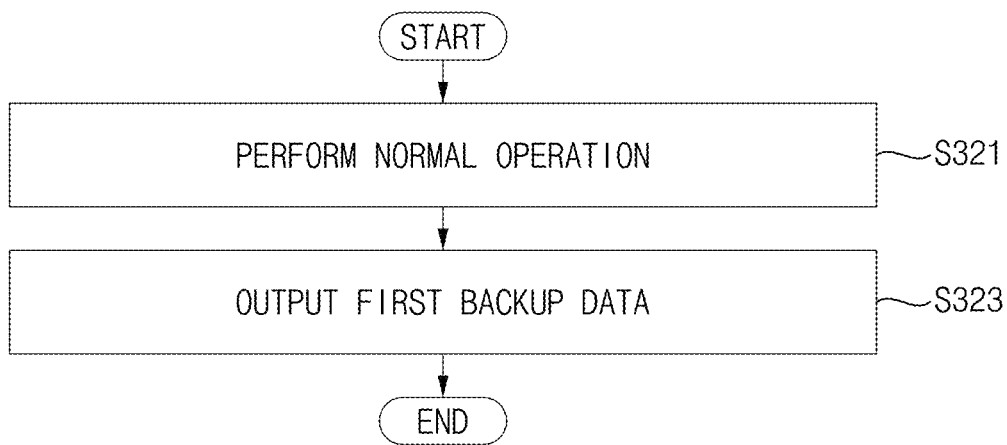
FIG. 16 is a flowchart illustrating an example of restoring backup data when exiting the hibernation mode of FIG. 2.
Figure 17:
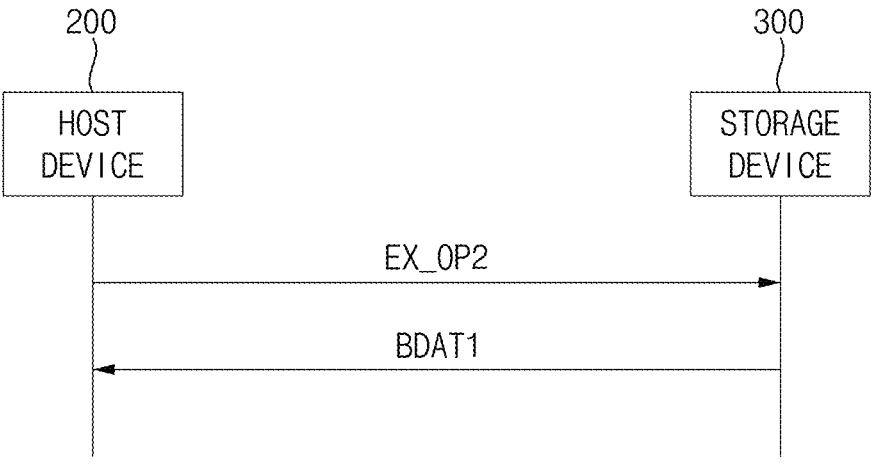
FIG. 17 is a diagram for explaining the operation of FIG. 16.

FIG. 16 is a flowchart illustrating an example of restoring backup data when exiting the hibernation mode of FIG. 2. FIG. 17 is a diagram for explaining the operation of FIG. 16.

Referring to FIGS. 2, 16, and 17, in S300, an example of the operations in the second operation mode OP2 corresponding to FIG. 13, e.g., an example of restoring the first backup data BDAT1 in the host memory 220 of the host device 200, is illustrated.

In some example embodiments, the storage device 300 may exit the hibernation mode and the second operation mode OP2, and operate in a normal mode (operation S321). For example, the host device 200 may transmit a second exit request EX_OP2 to the storage device 300 to exit the hibernation mode and the second operation mode OP2. Accordingly, the storage controller 310, the non-volatile memory 320, and the volatile memory 330 included in the storage device 300 may operate in the normal mode.

After the operations in the normal mode, the storage device 300 may output the first backup data BDAT1 (operation S323). For example, the storage device 300 may prepare to transmit the first backup data BDAT1, may output the first backup data BDAT1, and may transmit the first backup data BDAT1 to the host device 200. For example, S313 may be performed by the backup manager 312 in FIG. 1. The first backup data BDAT1 transmitted to the host device 200 may be restored in the host memory 220.

Accordingly, as illustrated in FIG. 1, the storage device 300 and the host device 200 may operate in the same state as before entering the hibernation mode.

In some example embodiments, as described above with reference to FIGS. 15A and 15B, when the second backup data BDAT2 is stored in the plurality of volatile memories VMa, VMb, and VMc or in the plurality of areas REGa, REGb, and REGc, an operation of restoring the second backup data BDAT2 in an original location (e.g., a location immediately before entering the hibernation mode) may be additionally performed after S321.

In some example embodiments, in the second operation mode OP2, the storage device 300 may not be powered off and then not powered on, and therefore, the storage device 300 may recover the operating state immediately before entering the hibernation mode without operating according to the boot sequence in S321. Accordingly, in the second operation mode OP2, the hibernation flag HFLG and the recovery operation based on the hibernation flag HFLG described above with reference to FIGS. 9 to 12 may be unnecessary.

Figure 18:
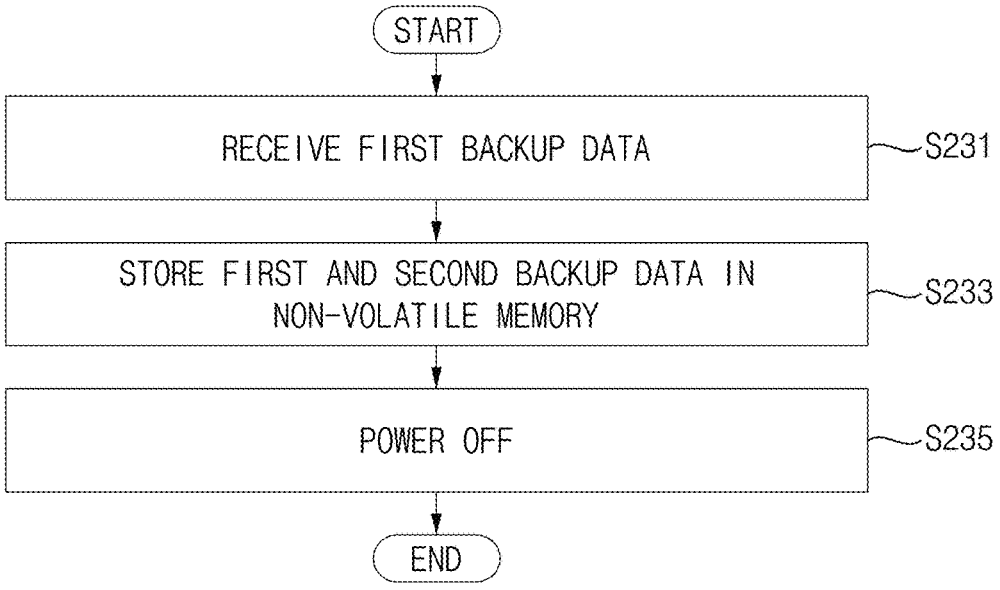
FIG. 18 is a flowchart illustrating an example of storing backup data when entering the hibernation mode of FIG. 2.
Figure 19A:
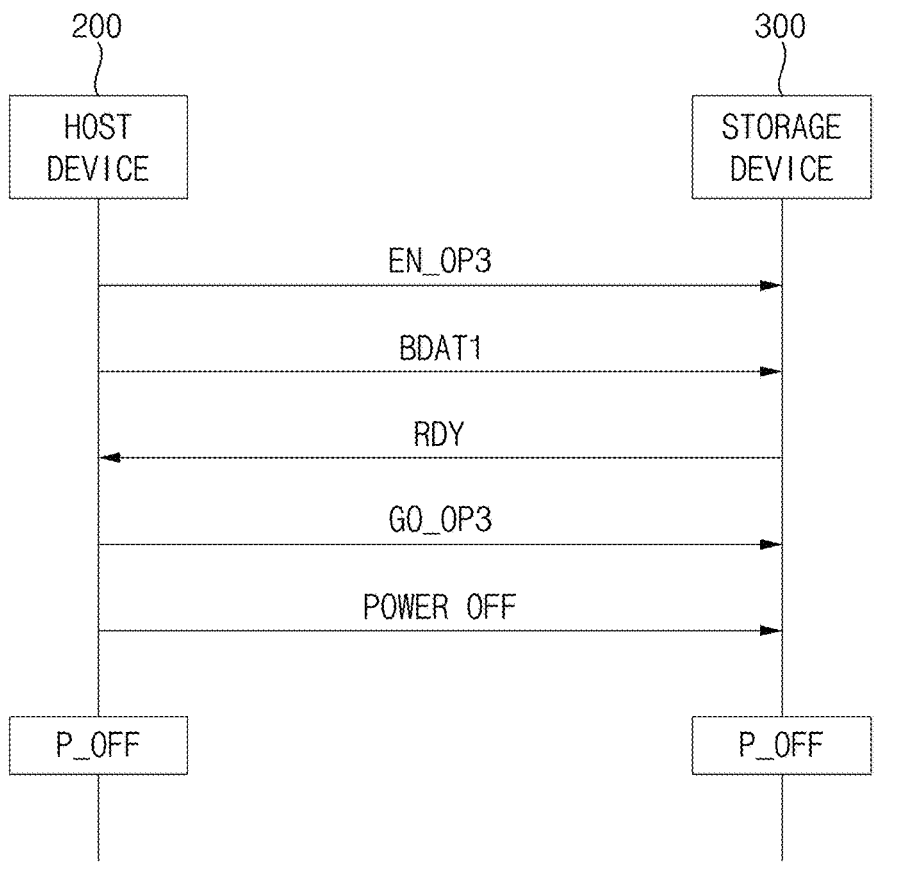
Figure 19B:
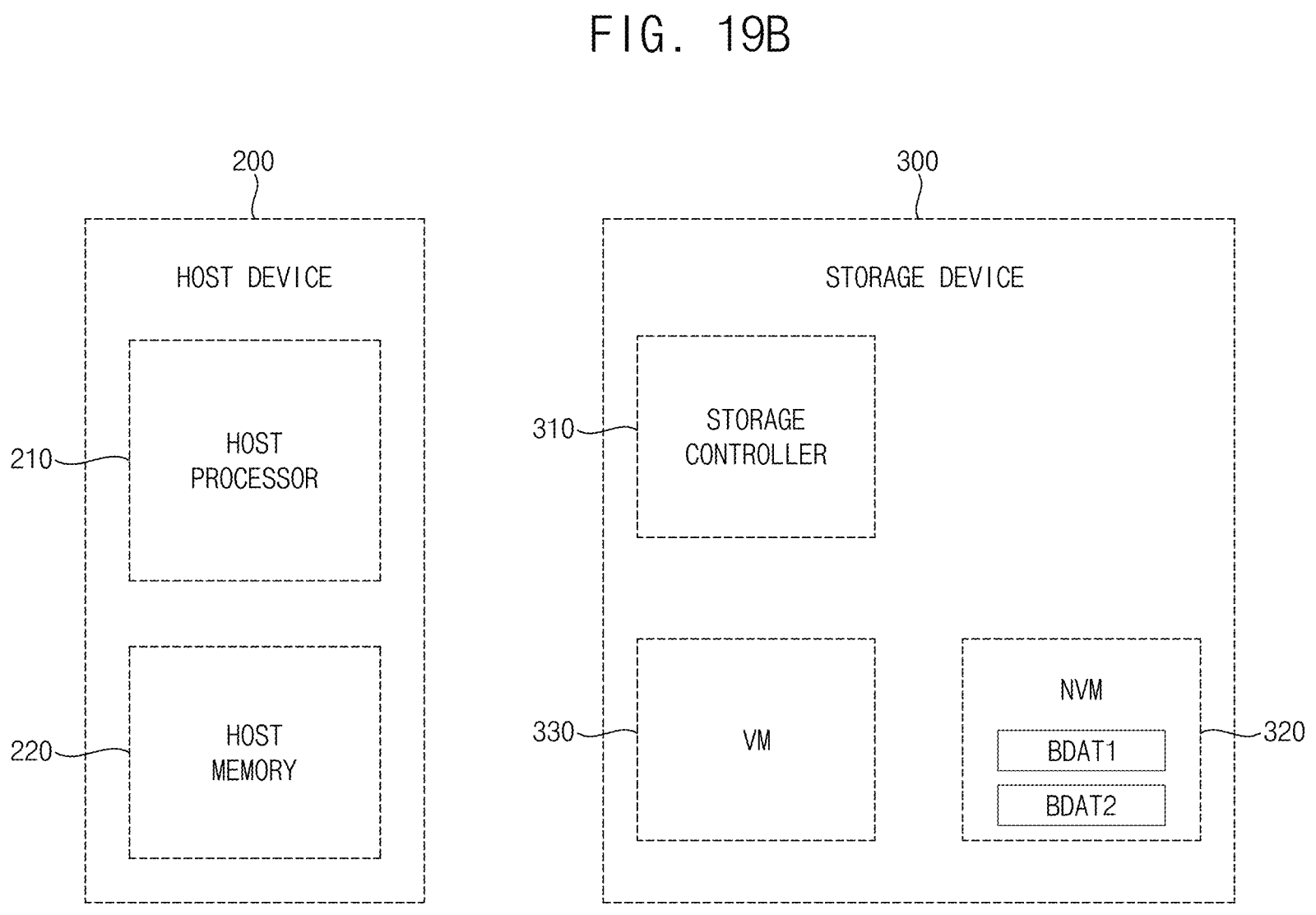

FIG. 18 is a flowchart illustrating an example of storing backup data when entering the hibernation mode of FIG. 2. FIGS. 19A and 19B are diagrams for explaining the operation of FIG. 18.

Referring to FIGS. 2, 18, 19A, and 19B, in S200, an example of the operation in the third operation mode OP3, e.g., an example of storing the first and second backup data BDAT1 and BDAT2 in the non-volatile memory 320 of the storage device 300, is illustrated.

In some example embodiments, the storage device 300 may receive the first backup data BDAT1 when entering the hibernation mode and the third operation mode OP3 (operation S231). For example, the host device 200 may transmit a third entry request EN_OP3 to the storage device 300 to enter the hibernation mode and the third operation mode OP3, the host device 200 may transmit the first backup data BDAT1 to the storage device 300, and the storage device 300 may receive the first backup data BDAT1. For example, S231 may be similar to S221 in FIG. 13, and may be performed by the backup manager 312 in FIG. 1.

After receiving the first backup data BDAT1, the storage device 300 may store the first and second backup data BDAT1 and BDAT2 in the non-volatile memory 320 (operation S233). For example, as illustrated in FIG. 19B, the first backup data BDAT1 transmitted to the storage device 300 and the second backup data BDAT2 stored in the volatile memory 330 may be stored together in the non-volatile memory 320. For example, S233 may be performed by the backup manager 312 in FIG. 1.

After storing the first and second backup data BDAT1 and BDAT2 in the non-volatile memory 320, the storage device 300 may be powered off (operation S235). For example, the storage device 300 may transmit the ready signal RDY indicating that the first backup data BDAT1 has been successfully stored to the host device 200, and the host device 200 may transmit a request GO_OP3 for proceeding to the third operation mode OP3 to the storage device 300. Thereafter, the host device 200 may block or cut off the power supplied to the storage device 300, and the storage device 300 may be in the power-off state P_OFF. For example, S235 may be similar to a combination of S213 in FIGS. 5 and S225 in FIG. 13. In FIG. 19B, the illustration and state of the storage device 300 and the components 310, 320, and 330 may be similar to the illustration and state of the storage device 300 and the components 310, 320, and 330 described above with reference to FIG. 6B.

In some example embodiments, the host device 200 may also be powered off. For example, the power supplied to the host device 200 may be blocked or cut off, and the host device 200 may be in the power-off state P_OFF. In FIG. 19B, the illustration and state of the host device 200 and the components 210 and 220 may be similar to the illustration and state of the host device 200 and the components 210 and 220 described above with reference to FIG. 14B.

As described above, even when both the host device 200 and the storage device 300 are powered off, the first and second backup data BDAT1 and BDAT2 stored in the non-volatile memory 320 may be retained without being lost.

Although FIG. 19B illustrates that the first and second backup data BDAT1 and BDAT2 are stored in the same non-volatile memory 320, example embodiments are not limited thereto, and the first and second backup data BDAT1 and BDAT2 may be stored in non-volatile memories that are different from each other among the plurality of non-volatile memories 320a to 320c included in the storage device 300.

Figure 20:
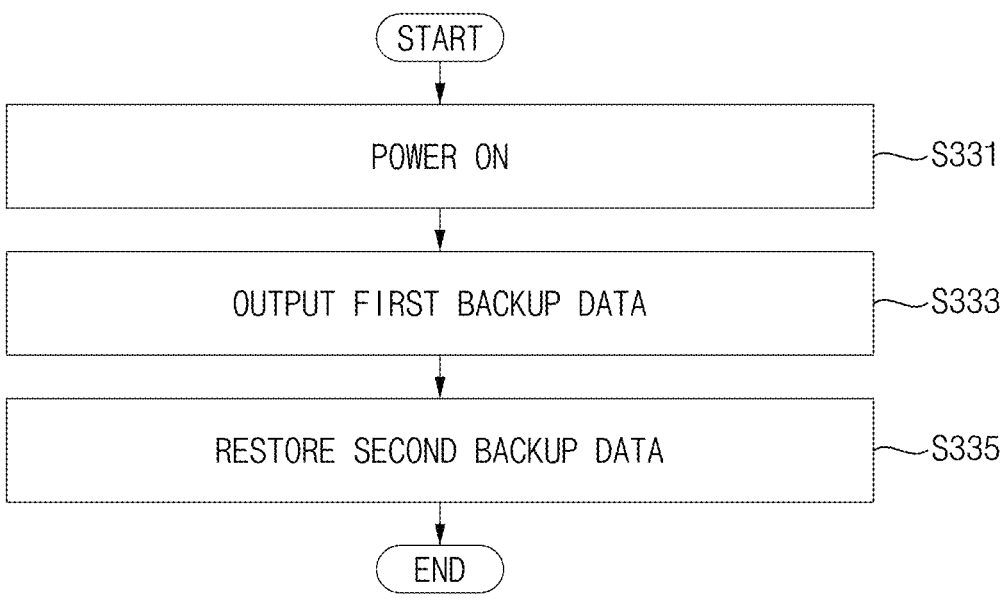
FIG. 20 is a flowchart illustrating an example of restoring backup data when exiting the hibernation mode of FIG. 2.
Figure 21:
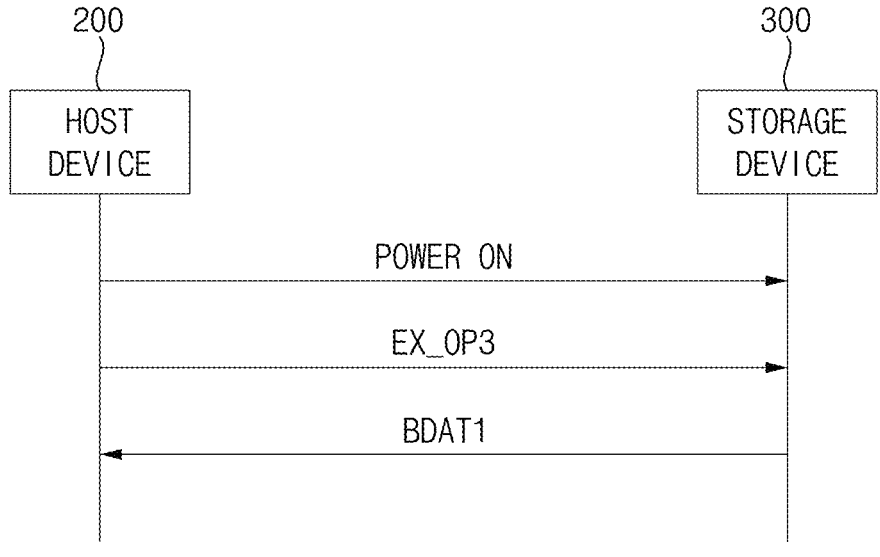
FIG. 21 is a diagram for explaining the operation of FIG. 20.

FIG. 20 is a flowchart illustrating an example of restoring backup data when exiting the hibernation mode of FIG. 2. FIG. 21 is a diagram for explaining the operation of FIG. 20.

Referring to FIGS. 2, 20, and 21, in S300, an example of the operations in the third operation mode OP3 corresponding to FIG. 18, e.g., an example of restoring the first and second backup data BDAT1 and BDAT2 in the host memory 220 of the host device 200 and the volatile memory 330 of the storage device 300, respectively, is illustrated.

In some example embodiments, the storage device 300 may be powered on to exit the hibernation mode and the third operation mode OP3 (operation S331). For example, the host device 200 may supply power to the storage device 300 and may transmit a third exit request EX_OP3 to the storage device 300 to exit the hibernation mode and the third operation mode OP3. For example, S331 may be similar to S311 in FIG. 7.

After being powered on, the storage device 300 may output the first backup data BDAT1 (operation S333). For example, the storage device 300 may prepare to transmit the first backup data BDAT1, may output the first backup data BDAT1, and may transmit the first backup data BDAT1 to the host device 200. For example, S333 may be similar to S323 in FIG. 16, and may be performed by the backup manager 312 in FIG. 1. The first backup data BDAT1 transmitted to the host device 200 may be restored in the host memory 220.

Additionally, after being powered on, the storage device 300 may restore the second backup data BDAT2 (operation S335). For example, the storage device 300 may restore the second backup data BDAT2 of the non-volatile memory 320 in the volatile memory 330. For example, S335 may be similar to S313 in FIG. 7, and may be performed by the backup manager 312 in FIG. 1.

Accordingly, as illustrated in FIG. 1, the storage device 300 and the host device 200 may operate in the same state as before entering the hibernation mode.

In some example embodiments, the operation of transmitting the first backup data BDAT1 to the host device 200, the operation of restoring the first backup data BDAT1 in the host memory 220, and the operation of restoring the second backup data BDAT2 in the volatile memory 330 may be performed in preference to operations of processing data other than the first and second backup data, such that the host device 200 and the storage device 300 quickly recover the operating state immediately before entering the hibernation mode.

Figure 22:
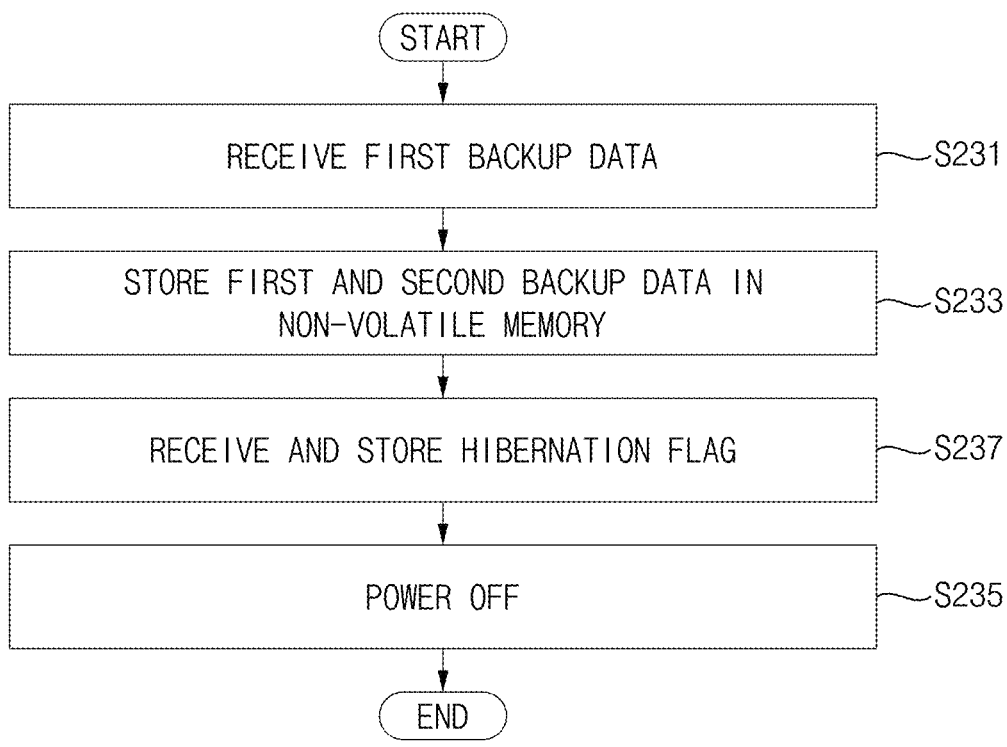
FIG. 22 is a flowchart illustrating an example of storing backup data when entering the hibernation mode of FIG. 2.
Figure 23A:
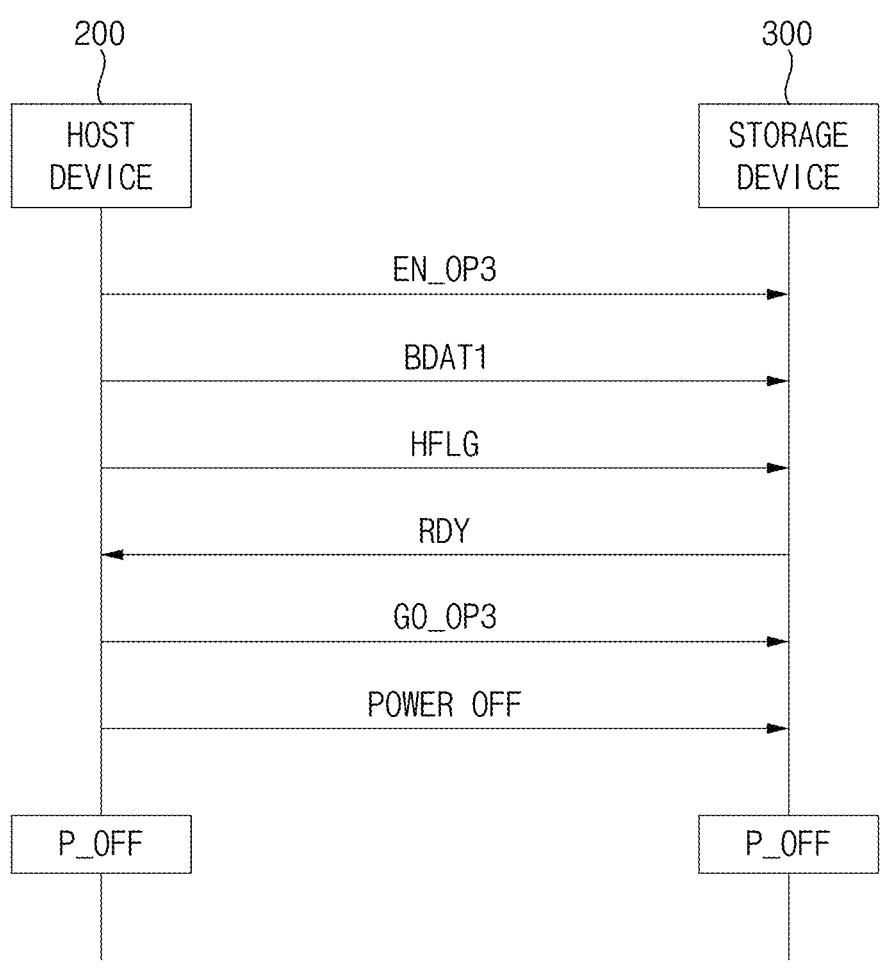

FIG. 22 is a flowchart illustrating an example of storing backup data when entering the hibernation mode of FIG. 2. FIGS. 23A and 23B are diagrams for explaining the operation of FIG. 22.

Referring to FIGS. 2, 22, 23A, and 23B, in S200, an example of the operations in the third operation mode OP3, e.g., an example of storing the first and second backup data BDAT1 and BDAT2 in the non-volatile memory 320 of the storage device 300, is illustrated.

S231, S233, and S235 in FIG. 22 may be substantially the same as S231, S233, and S235 in FIG. 18, respectively, and S237 in FIG. 22 may be substantially the same as S215 in FIG. 9. Descriptions repeated with or overlapping with descriptions of FIGS. 9, 10A, 10B, 18, 19A, and 19B will be omitted in the interest of brevity.

Figure 24:
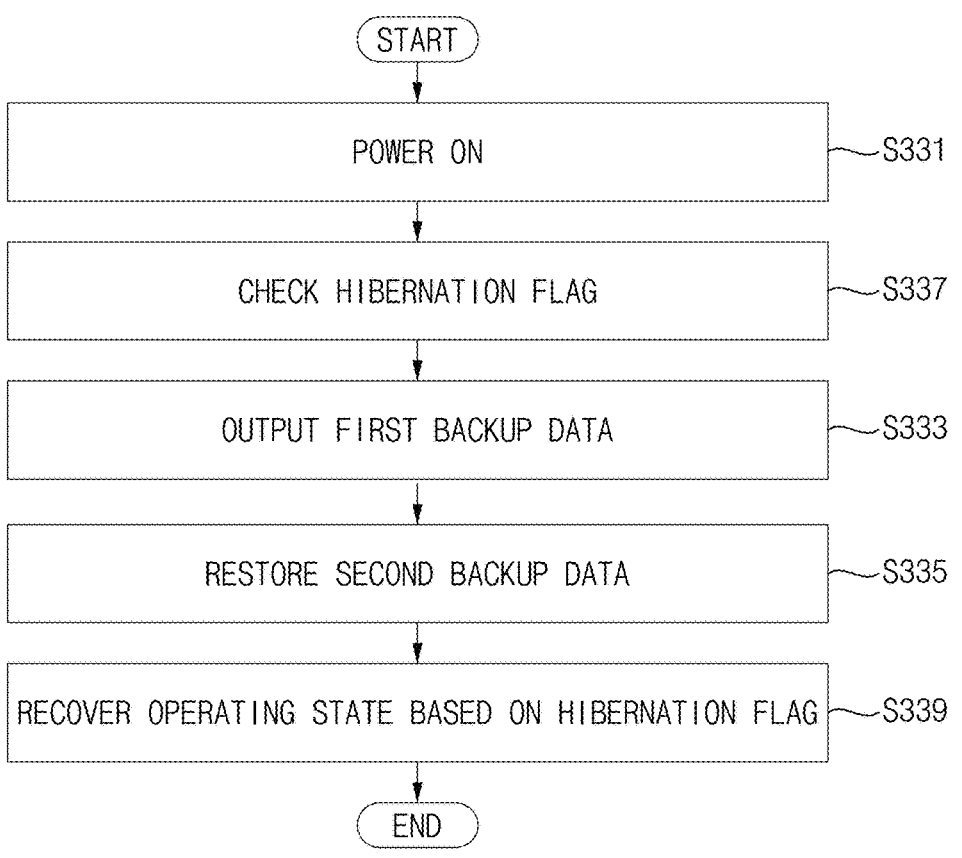
FIG. 24 is a flowchart illustrating an example of restoring backup data when exiting the hibernation mode of FIG. 2.
Figure 25:
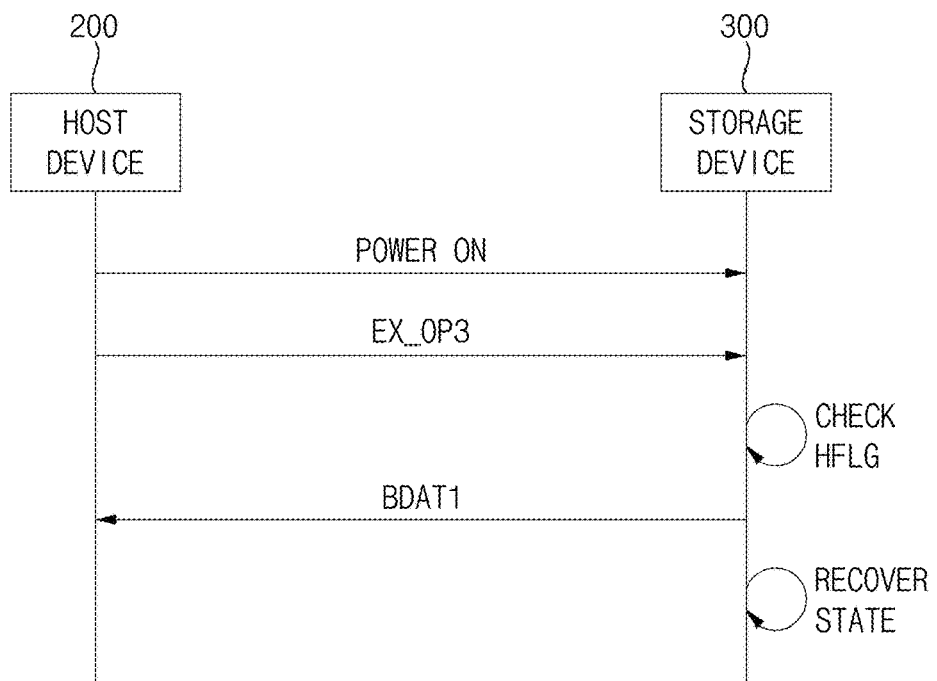
FIG. 25 is a diagram for explaining the operation of FIG. 24.

FIG. 24 is a flowchart illustrating an example of restoring backup data when exiting the hibernation mode of FIG. 2. FIG. 25 is a diagram for explaining the operation of FIG. 24.

Referring to FIGS. 2, 24, and 25, in S300, an example of the operations in the third operation mode OP3 corresponding to FIG. 22, e.g., an example of restoring the first and second backup data BDAT1 and BDAT2 in the host memory 220 of the host device 200 and the volatile memory 330 of the storage device 300, respectively, is illustrated.

S331, S333, and S335 in FIG. 24 may be substantially the same as S331, S333, and S335 in FIG. 20, respectively, and S337 and S339 in FIG. 24 may be substantially the same as S315 and S317 in FIG. 11, respectively. Descriptions repeated with or overlapping with descriptions of FIGS. 11, 12, 20, and 21 will be omitted in the interest of brevity.

As described above, when the storage device 300 is powered off, the storage device 300 may receive the hibernation flag HFLG and store the hibernation flag HFLG as in S237. In addition, when the storage device 300 is powered on, the storage device 300 may not operate according to the boot sequence, and may recover the operating state immediately before entering the hibernation mode based on the hibernation flag HFLG as in S337 and S339, thereby reducing the time interval to exit the hibernation mode.

In the storage devices and the storage systems according to example embodiments, when the storage devices and the storage systems enter the hibernation mode, backup data may be selectively stored in one of the host memory 220 of the host device 200, the volatile memory 330 of the storage device 300, and the non-volatile memory 320 of the storage device 300, depending on the operating state. The storage location of the backup data BDAT1 and BDAT2 may be set differently depending on various operating states, and thus power optimization may be efficiently performed. In addition, when the storage devices and the storage systems exit from the hibernation mode, the latest operating state immediately before entering the hibernation mode may be quickly recovered based on the hibernation flag, and thus the deterioration of operating performance may be prevented.

Figure 26:
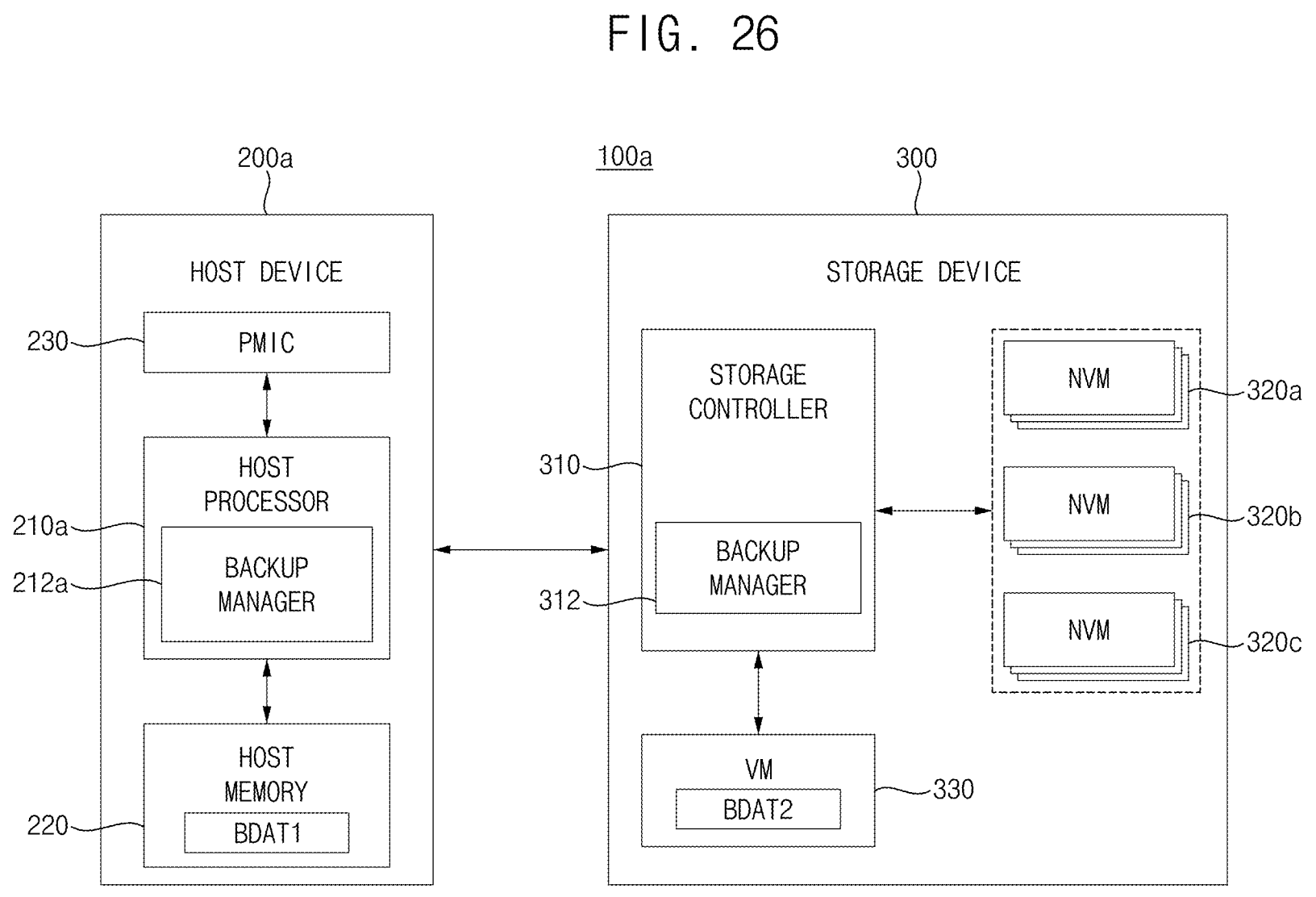
Figure 27:
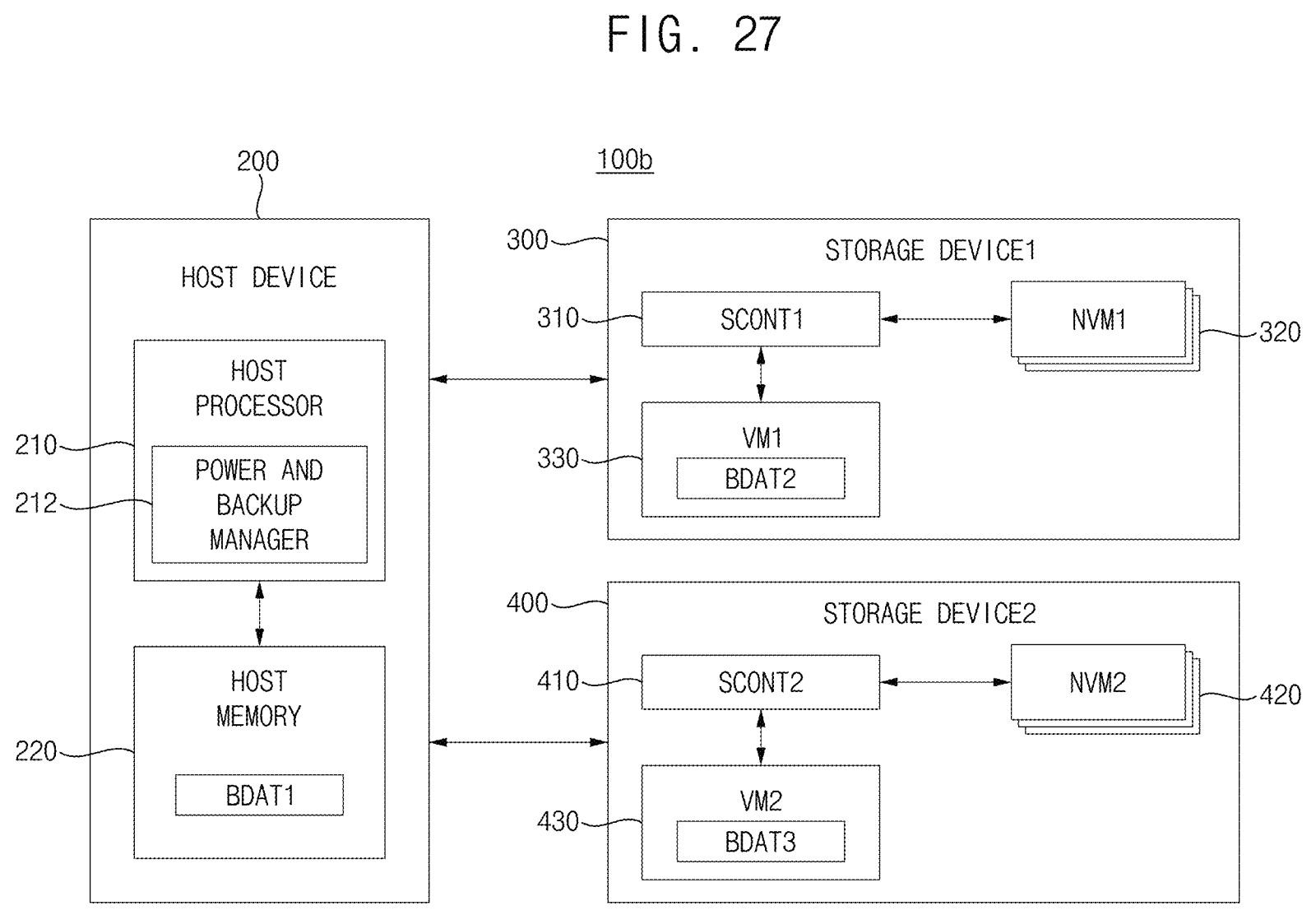

FIGS. 26 and 27 are block diagrams illustrating the storage device and the storage system including the storage device according to the example embodiments. Descriptions repeated with or overlapping with descriptions of FIG. 1 will be omitted in the interest of brevity.

Referring to FIG. 26, a storage system 100a may include a host device 200a and the storage device 300.

The storage system 100a may be substantially the same as the storage system 100 in FIG. 1, except that a configuration of the host device 200a is changed.

The host device 200a may include a host processor 210a, the host memory 220, and a power management integrated circuit (PMIC) 230. The host processor 210a may include a backup manager 212a.

The PMIC 230 may control the power supplied to the host device 200a and the storage device 300. The backup manager 212a may control data backup operations.

The PMIC 230 and the backup manager 212a may correspond to the power and backup manager 212 in FIG. 1, and may perform operations related to or associated with the hibernation mode according to example embodiments. For example, the PMIC 230 may perform operations such as setting a plurality of operation modes in the hibernation mode and controlling entry into the hibernation mode and exit from the hibernation mode. For example, the backup manager 212a may perform an operation of storing/restoring the first and second backup data BDAT1 and BDAT2.

In some example embodiments, the PMIC 230 may be placed outside the host device 200a.

Referring to FIG. 27, a storage system 100b may include the host device 200, a first storage device 300, and a second storage device 400.

The storage system 100b may be substantially the same as the storage system 100 in FIG. 1, except that the storage system 100b further includes the second storage device 400.

The first storage device 300 may include a first storage controller (SCONT1) 310, a plurality of first non-volatile memories (NVM1) 320, and at least one first volatile memory (VM1) 330. The first storage device 300, the first storage controller 310, the plurality of first non-volatile memories 320, and the at least one first volatile memory 330 may be substantially the same as the storage device 300, the storage controller 310, the plurality of non-volatile memories 320a to 320c, and the at least one volatile memory 330 in FIG. 1, respectively.

The second storage device 400 may include a second storage controller (SCONT2) 410, a plurality of second non-volatile memories (NVM2) 420, and at least one second volatile memory (VM2) 430. The second storage device 400, the second storage controller 410, the plurality of second non-volatile memories 420, and the at least one second volatile memory 430 may be substantially the same as the storage device 300, the storage controller 310, the plurality of non-volatile memories 320a to 320c, and the at least one volatile memory 330 in FIG. 1, respectively. The second volatile memory 430 may store third backup data BDAT3 which is essential and/or important for the operation of the second storage device 400 while the second storage device 400 is operating.

To perform operations related to or associated with the hibernation mode according to example embodiments, the host processor 210 may include the power and backup manager 212. Although omitted for convenience of illustration, each of the first and second storage controllers 310 and 410 may include a backup manager that is substantially the same as the backup manager 312 in FIG. 1.

Operations of the storage system 100b and the storage devices 300 and 400 in the hibernation mode may be substantially the same as those described above with reference to FIGS. 1 to 25.

For example, the storage controllers 310 and 410 may provide leakage current information of the storage devices 300 and 400 to the host device 200, and the host device 200 may set a plurality of operation modes in the hibernation mode based on the leakage current information of the host device 200 and the leakage current information of the storage devices 300 and 400. The host device 200 may control entry to the hibernation mode and exit from the hibernation mode. When entering the hibernation mode, the host device 200 may select one of the plurality of operation modes based on the leakage current information and the operation state. In the hibernation mode, the first to third backup data BDAT1 to BDAT3 may be stored in the host memory 220 of the host device 200, the volatile memories 330 and 430 of the storage devices 300 and 400, or the non-volatile memories 320 and 420 of the storage devices 300 and 400. When exiting the hibernation mode, the first to third backup data BDAT1 to BDAT3 may be restored, and the operation state of the host device 200 and/or the storage devices 300 and 400 may be recovered.

FIGS. 28A, 28B, 28C, and 28D are diagrams for explaining the operation of the storage device and the storage system in FIG. 27. For convenience of illustration, only components related to or associated with data storage are illustrated.

Referring to FIG. 28A, an example of entering the hibernation mode and the first operation mode OP1 is illustrated. For example, when the amount of leakage current of the host memory 220 is less than the amount of leakage current of each of the volatile memories 330 and 430, the first operation mode OP1 may be selected to store the first to third backup data BDAT1 to BDAT3 in the host memory 220. For example, similar to that described above with reference to FIG. 6B, only the host memory 220 may operate in the low power mode to retain the first to third backup data BDAT1 to BDAT3, and the storage devices 300 and 400 may be powered off.

Figure 28B:
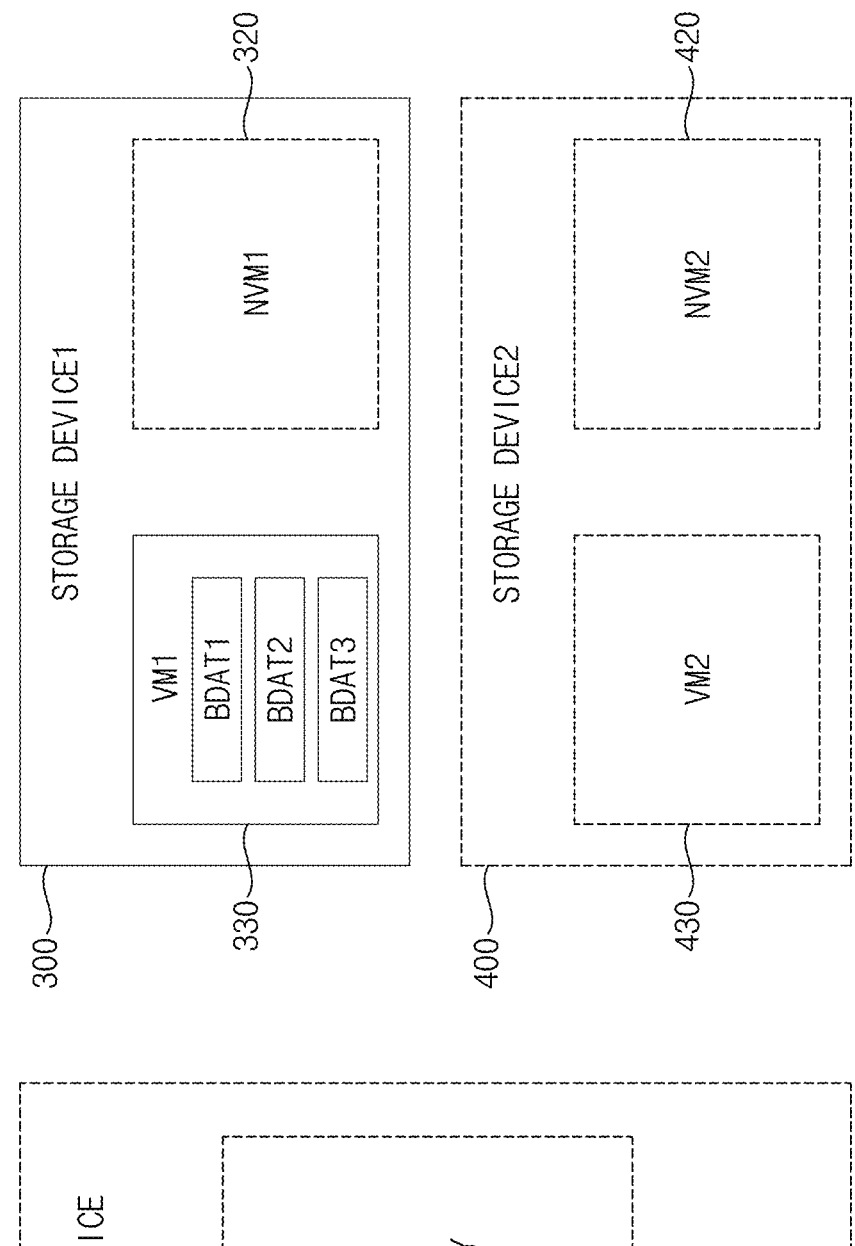
Figure 28C:
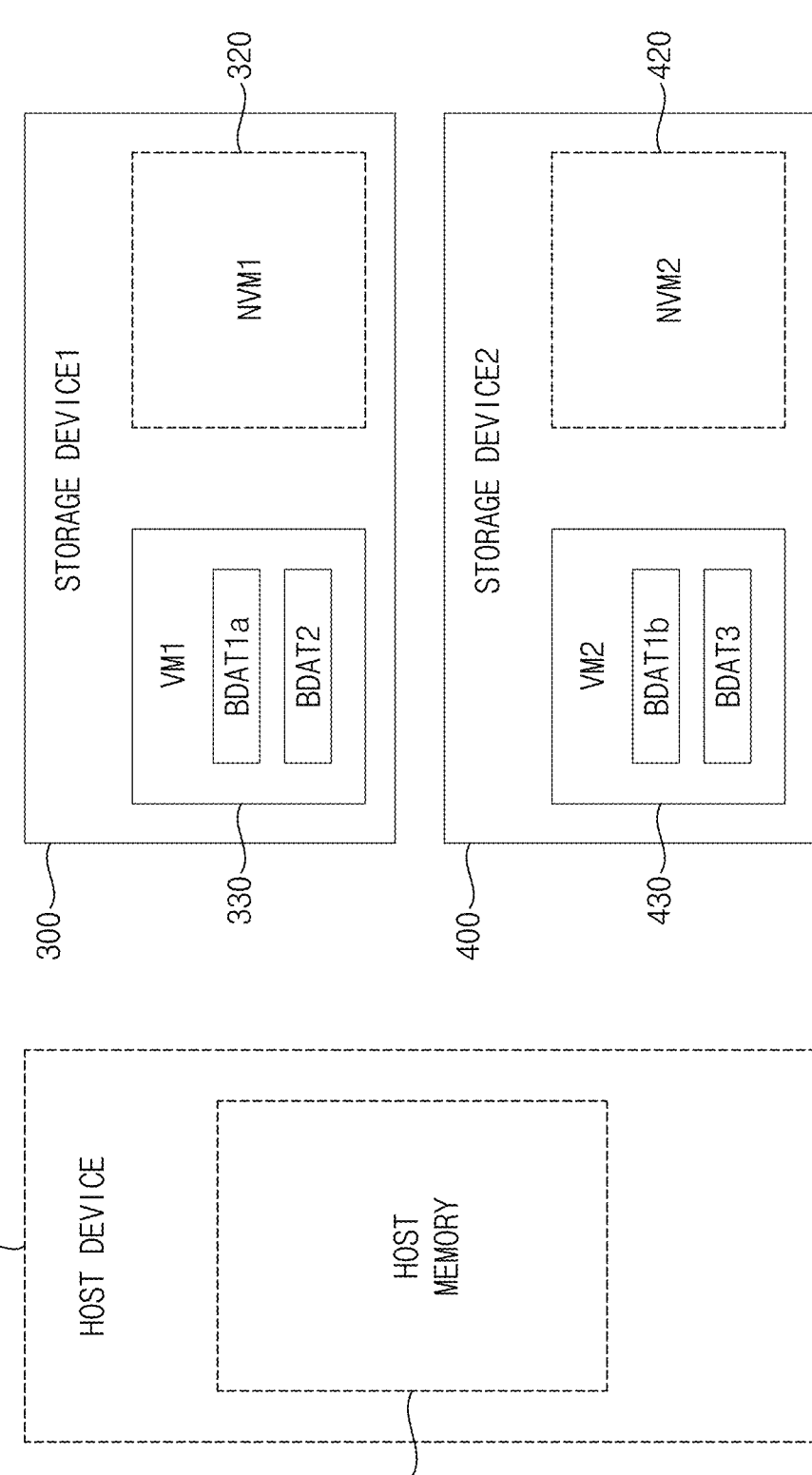

Referring to FIGS. 28B and 28C, an example of entering the hibernation mode and the second operation mode OP2 is illustrated.

In some example embodiments, as illustrated in FIG. 28B, one of the storage devices 300 and 400 may be selected in the second operation mode OP2 to store the first to third backup data BDAT1 to BDAT3. For example, when the amount of leakage current of the volatile memory 330 is less than the amount of leakage current of each of the host memory 220 and the volatile memory 430, the second operation mode OP2 may be selected to store the first to third backup data BDAT1 to BDAT3 in the volatile memory 330. For example, similar to that described above with reference to FIG. 14B, only the volatile memory 330 may operate in the low power mode to retain the first to third backup data BDAT1 to BDAT3, and the host device 200 and the storage device 400 may be powered off and the non-volatile memory 320 may be disabled. Although an example of selecting the storage device 300 is illustrated, example embodiments are not limited thereto, and the storage device 400 may be selected according to the leakage current information.

In some example embodiments, as illustrated in FIG. 28C, all of the storage devices 300 and 400 may be selected in the second operation mode OP2 to store the first to third backup data BDAT1 to BDAT3. For example, when the sum of the amount of leakage currents of the volatile memories 330 and 430 is less than the amount of leakage current of the host memory 220, the second operation mode OP2 may be selected to store the first to third backup data BDAT1 to BDAT3 in the volatile memories 330 and 430. For example, when the size of the first to third backup data BDAT1 to BDAT3 is larger than the storage capacity of each of the volatile memories 330 and 430, e.g., when it is difficult to store all of the first to third backup data BDAT1 to BDAT3 in one of the volatile memories 330 and 430, the first to third backup data BDAT1 to BDAT3 may be stored in the volatile memories 330 and 430. For example, a first part BDAT1*a* of the first backup data BDAT1 and the second backup data BDAT2 may be stored in the first volatile memory 330, and a second part BDAT1*b* of the first backup data BDAT1 and the third backup data BDAT3 may be stored in the second volatile memory 430, but example embodiments are not limited thereto. For example, similar to that described above with reference to FIG. 14B, only the volatile memories 330 and 430 may operate in the low power mode to retain the first to third backup data BDAT1 to BDAT3, the host device 200 may be powered off, and the non-volatile memories 320 and 420 may be disabled.

Figure 28D:
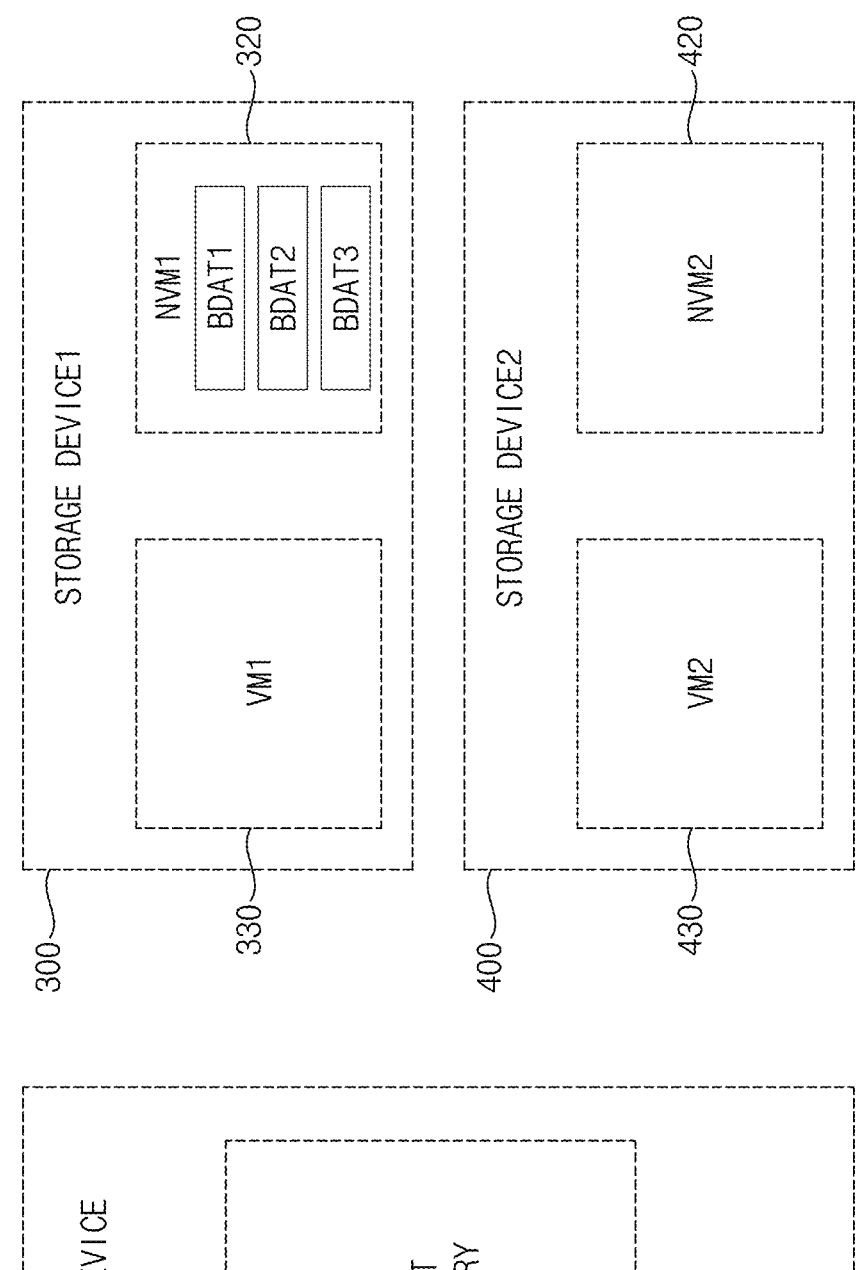

Referring to FIG. 28D, an example of entering the hibernation mode and the third operation mode OP3 is illustrated. For example, when the total amount of leakage current of the storage system 100*b* is greater than the amount of reference current and it is necessary to further reduce power consumption, the third operation mode OP3 may be selected to store the first to third backup data BDAT1 to BDAT3 in the non-volatile memory 320. For example, similar to that described above with reference to FIG. 19B, all the host device 200 and the storage devices 300 and 400 may be powered off. Although an example of selecting the storage device 300 is illustrated, example embodiments are not limited thereto, and the storage device 400 may be selected or all of the storage devices 300 and 400 may be selected.

According to example embodiments, the host device 200 in FIG. 27 may be implemented similarly to the host device 200*a* in FIG. 26. Although an example including two storage devices 300 and 400 is illustrated with reference to FIG. 27, example embodiments are not limited thereto, and example embodiments may be applied to the storage system including three or more storage devices.

Figure 29:
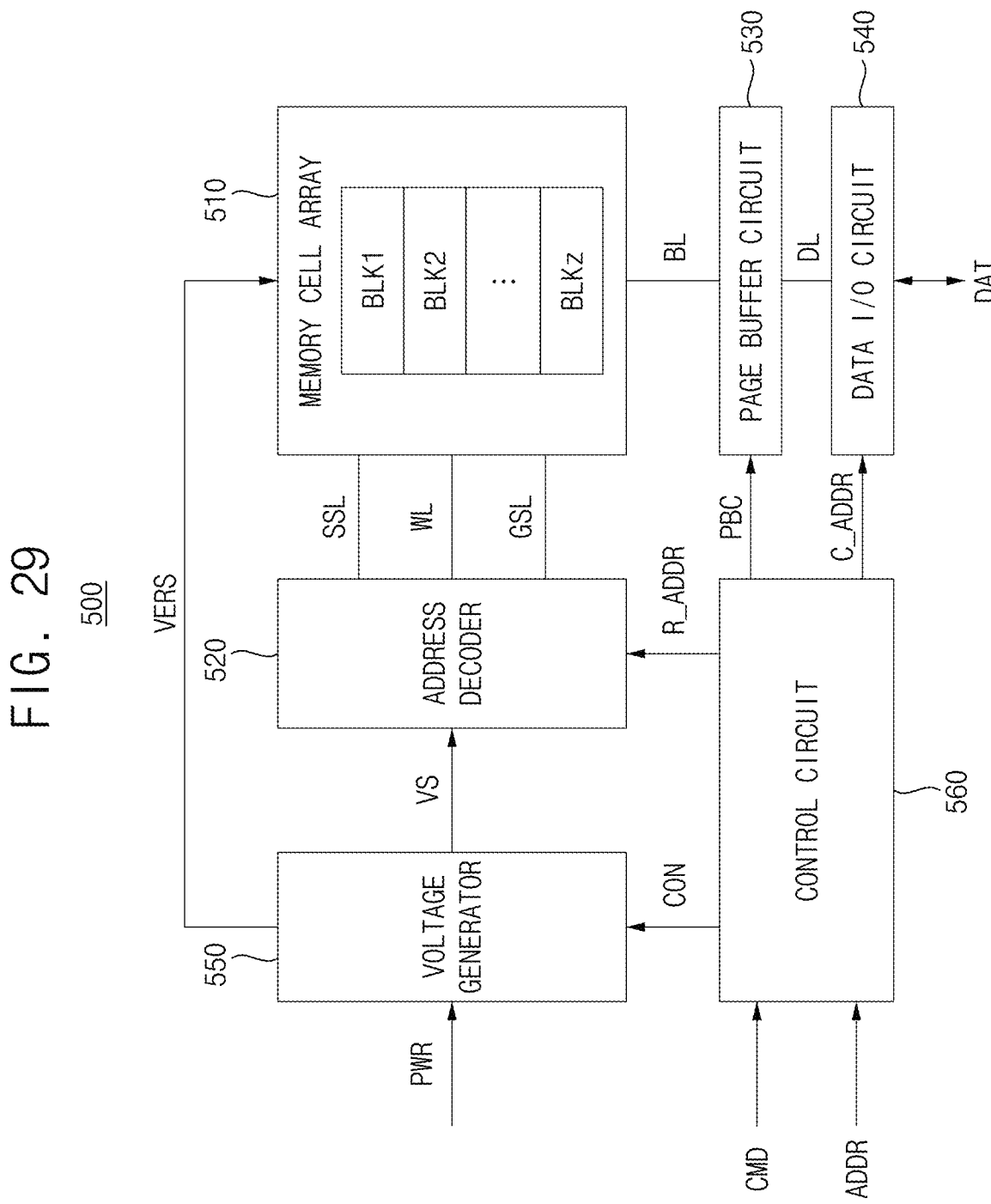
FIG. 29 is a block diagram illustrating an example of a non-volatile memory included in a storage device according to example embodiments.

FIG. 29 is a block diagram illustrating an example of the non-volatile memory included in the storage device according to example embodiments.

Referring to FIG. 29, a non-volatile memory 500 (corresponding to non-volatile memory 320, 320*a*, 320*b* 320*c*) may include a memory cell array 510, an address decoder 520, a page buffer circuit 530, a data input/output (I/O) circuit 540, a voltage generator 550, and a control circuit 560.

The memory cell array 510 may be connected to the address decoder 520 through a plurality of string selection lines SSL, a plurality of word lines WL, and a plurality of ground selection lines GSL. Additionally, the memory cell array 510 may be connected to the page buffer circuit 530 through a plurality of bit lines BL. The memory cell array 510 may include a plurality of memory cells connected to the plurality of word lines WL and the plurality of bit lines BL. The memory cell array 510 may be divided into a plurality of memory blocks BLK1, BLK2, . . . , BLKz each including memory cells. Additionally, each of the memory blocks BLK1 to BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer. The following patent documents, which are hereby incorporated by reference in their entireties, describe configurations for a memory cell array including a 3D vertical array structure, in which the three-dimensional memory array is configured as a plurality of levels, with word lines and/or bit lines shared between levels: U.S. Pat. Nos. 7,679,133; 8,553,466; 8,654,587; 8,559,235; and U.S. Pat. Pub. No. 2011/0233648.

The control circuit 560 may receive a command CMD and an address ADDR from an external device (e.g., the storage controller 310), and may control an erase loop, a program loop, and a read operation of the non-volatile memory 500 based on the command CMD and the address ADDR. Here, the program loop may include a program operation and a program verification operation, and the erase loop may include an erase operation and an erase verification operation. Here, the read operation may include a normal read operation and a data recovery read operation.

For example, the control circuit 560 may generate control signals CON for controlling the voltage generator 550 and control signals PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data input/output circuit 540.

The address decoder 520 may be connected to the memory cell array 510 through the plurality of string selection lines SSL, the plurality of word lines WL, and the plurality of ground selection lines GSL.

For example, during the erase/program/read operation, the address decoder 520 may determine at least one of the plurality of word lines WL as the selected word line, and may determine the rest of the word lines other than the selected word line among the plurality of word lines WL as non-selected word lines, in response to the row address R_ADDR.

Additionally, during the erase/program/read operation, the address decoder 520 may determine at least one of the plurality of string selection lines SSL as the selected string selection lines, and may determine the rest of the string selection lines among the plurality of string selection lines SSL as non-selected string selection lines, in response to the row address R_ADDR.

Further, during the erase/program/read operation, the address decoder 520 may determine at least one of the plurality of ground selection lines GSL as the selected ground selection lines, and may determine the rest of the ground selection lines among the plurality of ground selection lines GSL as non-selected ground selected lines, in response to the row address R_ADDR.

The voltage generator 550 may generate voltages VS required for operation of the non-volatile memory 500 based on a power supply voltage PWR and the control signals CON. The voltages VS may be applied to the plurality of string selection lines SSL, the plurality of word lines WL, and the plurality of ground selection lines GSL through the address decoder 520. Additionally, the voltage generator 550 may generate an erase voltage VERS required for the erase operation based on the power supply voltage PWR and the control signals CON.

For example, during the erase operation, the voltage generator 550 may apply the erase voltage VERS to a common source line and/or the bit line BL of the memory blocks BLK1 to BLKz, and may apply an erase permission voltage (e.g., a ground voltage) to all word lines of one memory block through the address decoder 520. During the erase verification operation, the voltage generator 550 may apply an erase verification voltage simultaneously to all word lines of one memory block or sequentially to the word lines one by one through the address decoder 520.

For example, during the program operation, the voltage generator 550 may apply a program voltage to the selected word line and may apply a program pass voltage to the unselected word lines through the address decoder 520. During the program verification operation, the voltage generator 550 may apply a program verification voltage to the selected word line and may apply a verification pass voltage to the unselected word lines through the address decoder 520.

Additionally, during the normal read operation, the voltage generator 550 may apply a read voltage to the selected word line and may apply a read pass voltage to the unselected word lines through the address decoder 520. Additionally, during the data recovery read operation, the voltage generator 550 may apply a read voltage to a word line adjacent to the selected word line, and may apply a recovery read voltage to the selected word line through the address decoder 520.

The page buffer circuit 530 may be connected to the memory cell array 510 through the plurality of bit lines BL. The page buffer circuit 530 may include a plurality of page buffers. In some example embodiments, one bit line may be connected to one page buffer. In other example embodiments, two or more bit lines may be connected to one page buffer.

The page buffer circuit 530 may store write data DAT to be programmed into the memory cell array 510 or read data DAT sensed from the memory cell array 510. For example, the page buffer circuit 530 may operate as a write driver or a detect amplifier depending on the operation mode of the non-volatile memory 500.

The data input/output circuit 540 may be connected to the page buffer circuit 530 through data lines DL. In response to the column address C_ADDR, the data input/output circuit 540 may provide data DAT to the memory cell array 510 through the page buffer circuit 530 or may provide data DAT output from the memory cell array 510 through the page buffer circuit 530 to the outside.

Although the non-volatile memory according to example embodiments has been described based on the NAND flash memory, the non-volatile memory according to the example embodiments may be at least one of various other non-volatile memories such as a phase change random access memory (PRAM), a resistive random access memory (RRAM), a nano floating gate memory (NFGM), a polymer random access memory (PoRAM), a magnetic random access memory (MRAM), a ferroelectric random access memory (FRAM), etc.

FIG. 30 is a block diagram illustrating an example of the storage controller included in the storage device according to example embodiments.

Referring to FIG. 30, a storage controller 600 (corresponding to.e., the storage controller 310 in FIG. 1) may include a processor 610, a memory 620, a backup manager 630, a host interface (I/F) 640, an error correction code (ECC) engine 650, and a memory interface 660, and an advanced encryption standard (AES) engine 670.

The processor 610 may control the operation of the storage controller 600 in response to a request received from the host device 200 through the host interface 640. For example, the processor 610 may control the operation of the storage device 300 and may control each configuration by employing firmware to drive the storage device 300.

The memory 620 may store instructions and data which are executed and processed by the processor 610. For example, the memory 620 may be implemented as a volatile memory such as an SRAM, a DRAM, etc.

The backup manager 630 may be substantially the same as the backup manager 312 included in the storage device according to example embodiments described above with reference to FIG. 1. For example, the backup manager 630 may be included in a flash translation layer (FTL) which performs various functions such as address mapping, wear-leveling, and garbage collection.

The ECC engine 650 for error correction may perform coded modulation using a bose-chaudhuri-hocquenghem (BCH) code, a low density parity check (LDPC) code, a turbo code, a reed-solomon code, a convolution code, a recursive systematic code (RSC), a trellis-coded modulation (TCM), a block coded modulation (BCM), etc., or may perform ECC encoding and ECC decoding using above-described codes other error correction codes.

The host interface 640 may provide a physical connection between the host device 200 and the storage device 300. For example, the host interface 640 may provide interfacing with the storage device 300 in response to a bus format of the host device 200. In some example embodiments, the bus format of host device 200 may be the SCSI or SAS. In other example embodiments, the bus format of the host device 200 may be a USB, a peripheral component interconnect express (PCIe), an advanced technology attachment (ATA), a parallel ATA (PATA), a serial ATA (SATA), an NVMe, a compute express link (CXL), etc.

The memory interface 660 may exchange data with the non-volatile memories 320a to 320c. The memory interface 660 may transmit data to the non-volatile memories 320a to 320c and may receive data read from the non-volatile memories 320a to 320c. For example, the memory interface 660 may be implemented to comply with standard conventions such as Toggle or open NAND flash interface (ONFI).

The AES engine 670 may perform at least one of an encryption operation and a decryption operation on data input to the storage controller 600 using a symmetric-key algorithm. Although not illustrated in detail, the AES engine 670 may include an encryption module and a decryption module. According to the example embodiments, the encryption module and the decryption module may be implemented as separate modules or as one module.

Figure 31:
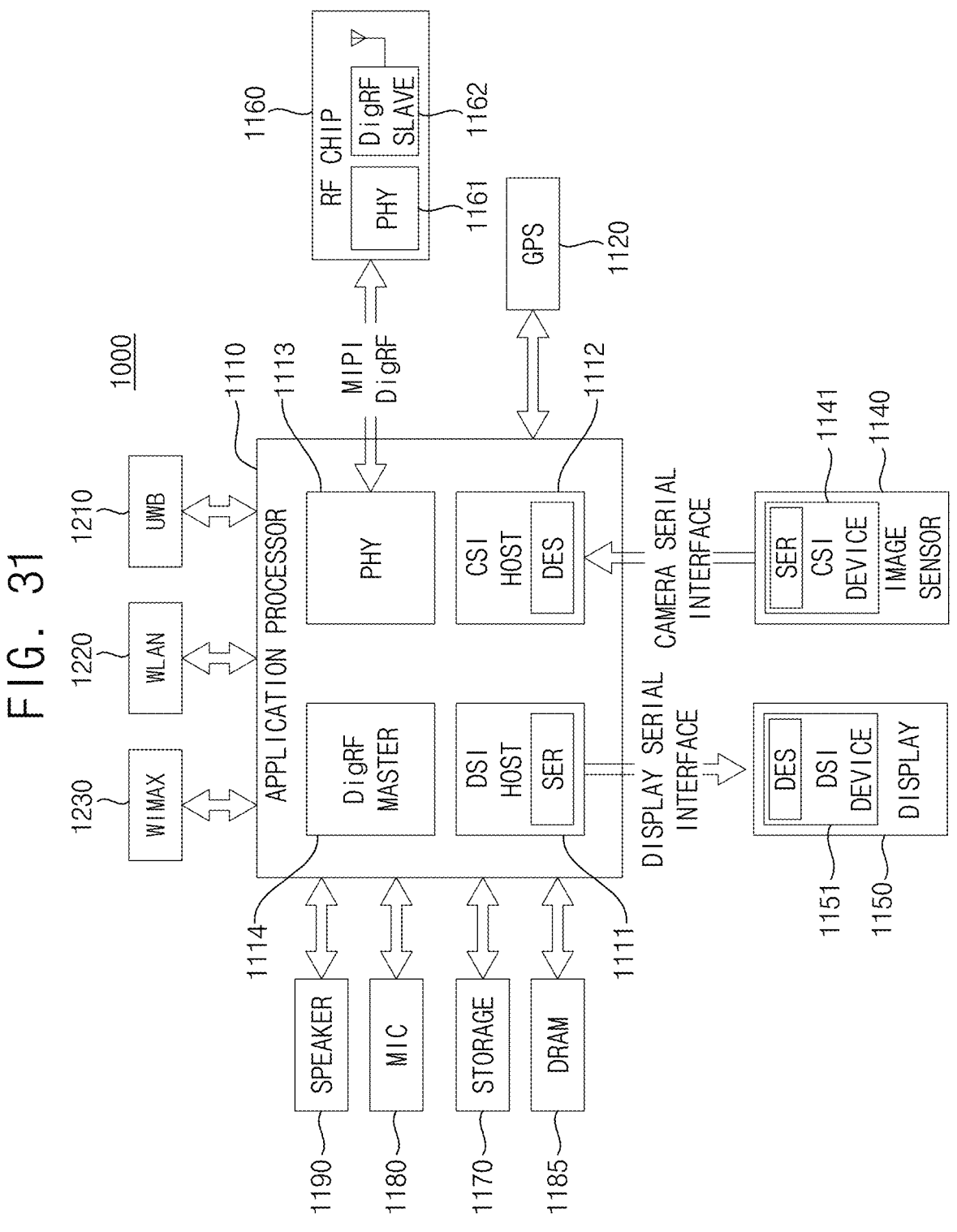
FIG. 31 is a block diagram illustrating an electronic system including a storage device according to example embodiments.

FIG. 31 is a block diagram illustrating an electronic system including the storage device according to example embodiments.

Referring to FIG. 31, an electronic system 1000 may be a mobile system including an application processor 1110, a storage 1170, etc. The electronic system 1000 may further include an image sensor 1140, a display 1150, a radio frequency (RF) chip 1160, a global positioning system (GPS) 1120, a storage 1170, a microphone 1180, a DRAM 1185, and a speaker 1190, and may communicate using an ultra-wideband (UWB) 1210, a wireless local area network (WLAN) 1220, a worldwide interoperability for microwave access (WIMAX) 1230, etc.

The application processor 1110 may be a controller or a processor that controls the operation of the storage 1170. For example, the application processor 1110 and the storage 1170 may respectively correspond to the host device and the storage device included in the storage system according to the example embodiments. The storage location of the backup data may be set differently depending on the various operating situations, and thus power optimization may be efficiently performed.

The application processor 1110 may include a display serial interface (DSI) host 1111 that performs a serial communication with a DSI device 1151 of the display 1150, a camera serial interface (CSI) host 1112 that performs a serial communication with a CSI device 1141 of the image sensor 1140, a physical layer (PHY) 1113 that performs data communications with a PHY 1161 of the RF chip 1160 based on a mobile industry processor interface (MIPI) DigRF, and a DigRF MASTER 1114 that controls the data communications of the physical layer 1161. A DigRF SLAVE 1162 of the RF chip 1160 may be controlled through the DigRF MASTER 1114.

In some example embodiments, the DSI host 1111 may include a serializer (SER) and the DSI device 1151 may include a deserializer (DES). In some example embodiments, the CSI host 1112 may include a deserializer (DES) and the CSI device 1141 may include a serializer (SER).

The example embodiments may be applied to various electronic devices and systems that include the storage devices. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A storage device comprising:
a plurality of non-volatile memories;
at least one volatile memory; and
a storage controller configured to control operations of the plurality of non-volatile memories and the at least one volatile memory, and to output leakage current information of the storage device to an external device,
wherein, when the storage device enters a hibernation mode such that the storage device reduces power consumption, the storage device is configured to operate in a selected operation mode from among a plurality of operation modes based on the leakage current information,
wherein, depending on the selected operation mode, the storage device is configured:
to store as a backup first backup data and second backup data in the at least one volatile memory,
to store as a backup the first backup data and the second backup data in the plurality of non-volatile memories, or
to output as a backup the second backup data to the external device, and
wherein, prior to entering the hibernation mode, the first backup data is stored in the external device, and the second backup data is stored in the storage device.

2. The storage device of claim 1, wherein the plurality of operation modes include a first operation mode, a second operation mode and a third operation mode,
wherein, in the first operation mode, the second backup data is transmitted by the storage device as a backup to a host device located external to the storage device, and the first and second backup data are stored as a backup in a host memory included in the host device,
wherein, in the second operation mode, the first backup data is received by the storage device as a backup from the host device, and the first and second backup data are stored as a backup in the at least one volatile memory, and
wherein, in the third operation mode, the first backup data is received by the storage device as a backup from the host device, and the first and second backup data are stored as a backup in the plurality of non-volatile memories.

3. The storage device of claim 2, wherein, in the first operation mode, after the storage device transmits as a backup the second backup data to the host device, the storage device is configured to be powered off.

4. The storage device of claim 3, wherein, in the first operation mode, when the storage device exits the hibernation mode after the storage device is powered off, the storage device is configured to be powered on, and the storage device is configured to receive the second backup data from the host device and to restore the second backup data.

5. The storage device of claim 3, wherein, in the first operation mode, after the storage device transmits as a backup the second backup data to the host device and before the storage device is powered off, the storage device is configured to receive a hibernation flag from the host device and to store the hibernation flag, and
wherein the hibernation flag corresponds to a latest operating state of the storage device before the storage device is powered off.

6. The storage device of claim 5, wherein, in the first operation mode, when the storage device exits the hibernation mode, the storage device is configured to be powered on, to receive the second backup data from the host device, to restore the second backup data, and to recover an operating state of the storage device based on the hibernation flag such that the operating state of the storage device corresponds to the latest operating state.

7. The storage device of claim 5, wherein the hibernation flag is stored in the plurality of non-volatile memories.

8. The storage device of claim 2, wherein, in the second operation mode, after the storage device stores as a backup the first and second backup data in the at least one volatile memory, the storage controller and the plurality of non-volatile memories are configured to be disabled, and the at least one volatile memory is configured to operate in a low power mode such that the first and second backup data are retained in the at least one volatile memory.

9. The storage device of claim 8, wherein, in the second operation mode, when the storage device exits the hibernation mode, the storage controller, the at least one volatile memory, and the plurality of non-volatile memories are configured to operate in a normal mode, and the storage device is configured to transmit the first backup data to the host device.

10. The storage device of claim 2, wherein, in the third operation mode, after the storage device stores as a backup the first and second backup data in the plurality of non-volatile memories, the storage device is configured to be powered off.

11. The storage device of claim 10, wherein, in the third operation mode, when the storage device exits the hibernation mode, the storage device is configured to be powered on, to transmit the first backup data to the host device, and to restore the second backup data.

12. The storage device of claim 11, wherein the operation of transmitting the first backup data to the host device and the operation of restoring the second backup data are performed in preference to operations of processing data other than the first and second backup data.

13. The storage device of claim 10, wherein, in the third operation mode, after the storage device stores as a backup the first and second backup data in the plurality of non-volatile memories and before the storage device is powered off, the storage device is configured to receive a hibernation flag from the host device and to store the hibernation flag, and wherein the hibernation flag corresponds to a latest operating state of the storage device before the storage device is powered off.

14. The storage device of claim 13, wherein, in the third operation mode, when the storage device exits the hibernation mode, the storage device is configured to be powered on, to transmit the first backup data to the host device, to restore the second backup data, and to recover an operating state of the storage device based on the hibernation flag such that the operating state of the storage device corresponds to the latest operating state.

15. A storage system comprising:
a host device including a host memory; and
a first storage device configured to be controlled by the host device,
wherein the first storage device includes:
a plurality of first non-volatile memories;
at least one first volatile memory; and
a first storage controller configured to control operations of the plurality of first non-volatile memories and the at least one first volatile memory, and to output first leakage current information on data retention of the first storage device to the host device,
wherein, when the storage system enters a hibernation mode such that the storage system reduces power consumption, the host device is configured to select one of a plurality of operation modes based on the first leakage current information and second leakage current information on data retention of the host device, and
wherein, depending on the selected operation mode from among the plurality of operation modes, the storage system is configured to store as a backup both first backup data of the host device and second backup data of the first storage device in one of the host memory, the at least one first volatile memory and the plurality of first non-volatile memories.

16. The storage system of claim 15, wherein the plurality of operation modes include a first operation mode, a second operation mode, and a third operation mode,
wherein, in the first operation mode, the first and second backup data is stored as a backup in the host memory, the host memory in the host device is configured to operate in a low power mode to retain the first and second backup data, and the first storage device is configured to be powered off,
wherein, in the second operation mode, the first and second backup data is stored as a backup in the at least one first volatile memory, the host device is configured to be powered off, and the at least one first volatile memory in the first storage device is configured to operate in a low power mode to retain the first and second backup data, and
wherein, in the third operation mode, the first and second backup data is stored as a backup in the plurality of first non-volatile memories, and both the host device and the first storage device are configured to be powered off.

17. The storage system of claim 16, wherein the host device is configured to:
select one of the first operation mode and the second operation mode by comparing an amount of a first leakage current induced by the host memory with an amount of a second leakage current induced by the at least one first volatile memory, or
select the third operation mode by comparing an amount of a total leakage current induced by the storage system with an amount of a reference current.

18. The storage system of claim 16, further comprising:
a second storage device configured to be controlled by the host device,
wherein the second storage device includes:
a plurality of second non-volatile memories;
at least one second volatile memory; and
a second storage controller configured to control operations of the plurality of second non-volatile memories and the at least one second volatile memory, and to output third leakage current information on data retention of the second storage device to the host device,
wherein, when the storage system enters the hibernation mode, the host device is configured to select one of the plurality of operation modes based on the first, second and third leakage current information.

19. The storage system of claim 18, wherein, in the second and third operation modes, the storage system is configured to select one of the first and second storage devices such that the storage system stores as a backup the first and second backup data and a third backup data of the second storage device in the selected one of the first and second storage devices.

20. A storage system comprising:
a host device including a first volatile memory; and
a storage device including a non-volatile memory, a second volatile memory, and a storage controller connected to the non-volatile memory and the second volatile memory,
wherein the host device and the storage device are configured to communicate with each other such that the host device and the storage device share leakage current information on data retention of the host device and the storage device,
wherein, when the storage system enters a hibernation mode such that the storage system reduces power consumption, the host device is configured to select one of a plurality of operation modes based on the leakage current information,
wherein, in a first operation mode among the plurality of operation modes, the first volatile memory is configured to store as a backup first backup data of the host device and second backup data of the storage device, the first volatile memory in the host device is configured to operate in a low power mode to retain the first and second backup data, and the storage device is configured to be powered off,
wherein, in a second operation mode among the plurality of operation modes, the second volatile memory is configured to store as a backup the first and second backup data, the host device is configured to be powered off, and the second volatile memory in the storage device is configured to operate in a low power mode to retain the first and second backup data, wherein, in a third operation mode among the plurality of operation modes, the non-volatile memory is configured to store as a backup the first and second backup data, and both the host device and the storage device are configured to be powered off, and wherein in the third operation mode, when the storage system exits the hibernation mode, the host device and the storage device are configured to be powered on, the first backup data is transmitted to the host device and restored in the first volatile memory, the second backup data is transmitted to the second volatile memory and restored in the second volatile memory, and the transmission operation of the first backup data and the transmission operation of the second backup data are performed in preference to operations of processing data other than the first and second backup data.

* * * * *